(12) United States Patent
Nishii et al.

(10) Patent No.: US 6,468,428 B1
(45) Date of Patent: Oct. 22, 2002

(54) GLASS MATERIAL FOR CARRYING A PHOTOCATALYST, FILTER DEVICE USING THE SAME AND LIGHT IRRADIATING METHOD

(75) Inventors: Yoshikazu Nishii; Nobuhiro Maeda; Shin-ichi Ogawa; Yoichi Hachitani; Masayuki Higashida; Itaru Watanabe, all of Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 08/930,536

(22) PCT Filed: Feb. 28, 1997

(86) PCT No.: PCT/JP97/00623

§ 371 (c)(1),
(2), (4) Date: Oct. 27, 1997

(87) PCT Pub. No.: WO97/31703

PCT Pub. Date: Sep. 4, 1997

(30) Foreign Application Priority Data

| Feb. 28, 1996 | (JP) | 8-413282 |
| Aug. 30, 1996 | (JP) | 8-248843 |
| Aug. 30, 1996 | (JP) | 8-248844 |
| Oct. 25, 1996 | (JP) | 8-283821 |
| Nov. 1, 1996 | (JP) | 8-291953 |
| Jan. 31, 1997 | (JP) | 9-18999 |

(51) Int. Cl.⁷ .................. B01D 29/11; B01D 39/00; B01D 39/06; B01D 53/02

(52) U.S. Cl. .............. 210/497.3; 210/500.26; 210/504; 210/509; 96/154

(58) Field of Search .............. 204/157.15, 157.3, 204/158.2; 502/5, 522, 439; 422/4, 310, 312; 501/32, 55, 69, 73, 904, 905, 35, 37, 60, 62, 63, 64, 58, 59, 61, 65, 66, 67, 74, 75, 76, 77, 78, 72; 55/514, 512, 523; 210/497.3, 500.26, 509, 504

(56) References Cited

U.S. PATENT DOCUMENTS

| 3,807,148 A | * | 4/1974 | Fike et al. .............. 55/385 |
| 4,585,298 A | * | 4/1986 | Mori .............. 350/96.1 |
| 4,861,484 A | * | 8/1989 | Lichtin et al. .............. 210/638 |
| 4,973,565 A | * | 11/1990 | Fine .............. 501/58 |
| 5,430,816 A | * | 7/1995 | Furuya et al. .............. 385/33 |
| 5,658,841 A | * | 8/1997 | Tanaka et al. .............. 502/305 |

FOREIGN PATENT DOCUMENTS

| DE | 4402537 | * 8/1995 |
| EP | 325133 | * 7/1989 |
| JP | 3-54132 | 3/1991 |
| JP | 5-154387 | 6/1993 |
| JP | 6-343875 | * 12/1994 |
| SU | 628104 | * 8/1978 |

OTHER PUBLICATIONS

Suzuki, "Toyota Chao Kenkyusho R&D Review", vol. 28, No. 3, pp. 47–56. (abstract) Sep. 1993.*

Suzuki, "Toyota Chao Kenkyusho R&D Review", vol. 28, No. 3, pp. 47–56. (abstract only)., Sep. 1993.*

(List continued on next page.)

*Primary Examiner*—Edna Wong
(74) *Attorney, Agent, or Firm*—Perman & Green, LLP

(57) ABSTRACT

A photocatalyst is carried on a surface of a light guiding body for guiding light needed to activate the photocatalyst in such a manner the light guided by the light guiding body irradiates directly from the surface of the light guiding body the photocatalyst.

13 Claims, 15 Drawing Sheets

OTHER PUBLICATIONS

Marinangeli et al., "Photo–Assisted Heterogenous Catalysis with Optical Fibers II. Nonisothermal Single Fiber and Fiber Bundle", AlChE Journal, vol. 26, No. 6, pp. 1000–1007. Nov. 1980.*

Hofstadler et al, New Reactor Design For Photocatalytic Wastewater Treatment With $TiO^2$Immobilized On Fused-silica Glass Fibers: Photomineralization Of 4–Chlorophenol; Environ. Sci. Technol., vol. 28, No. 4, pp. 670–674 (1994) No Month Available.

Patent Abstracts of Japan, JP 8–257410, Nippon Itagarasu Technoresearch K.K.) Oct. 8, 1996.

Patent Abstracts of Japan, JP 9–38503, Toyoda Gosei Co., Ltd., Feb. 10, 1997.

Patent Abstracts of Japan, JP 6–134476, Pentel Co., Ltd., May 17, 1994.

Patent Abstracts of Japan, JP 6–7905, Matsushita Electric Industrial Co., Ltd., Feb. 2, 1994, JP 2–280817.

Patent Abstracts of Japan, JP 8–89761, Nippon Oil Co., Ltd., Apr. 9, 1996.

Patent Abstracts of Japan, JP 57–200247, Tokyo Shibaura Electric Co., Dec. 8, 1982.

Patent Abstracts of Japan, JP 60–58443, Takashi Mori, Dec. 20, 1985, JP 58–21205.

Hashimoto and Fujishima, "Water and Drain", vol. 36, No. 10 (1994), pp. 5–11, no month available.

Susuki, "Toyota Chuo Kenkyusho R&D Review", vol. 28, No. 3 (Sep. 1993), pp. 47–56.

Yamazaki, "Chemistry and Industry", vol. 47, No. 2 (1994), pp. 152–155, No Month Available.

* cited by examiner

| FACTOR | TYPE | 1 | 2 | 3 | 4 |
|---|---|---|---|---|---|
| GLASS COMPOSITION SUBSTANCE (wt%) | $SiO_2$ | 49.0 | 59.5 | 53.5 | 81.0 |
| | $Al_2O_3$ | 10.0 | 15.5 | 15.0 | 2.3 |
| | $B_2O_3$ | 5.0 | 4.0 | 8.5 | 2.7 |
| | MgO | — | — | 4.5 | — |
| | CuO | — | — | 17.5 | — |
| | BaO | 25.0 | 18.5 | — | — |
| | $Na_2O$ | — | 1.5 | 0.4 | 4.0 |
| | $K_2O$ | — | 1.0 | — | — |
| | $As_2O_3$ | 1.0 | — | — | — |
| GLASS TRANSITION POINT (Tg/°C) | | 660 | 710 | 680 | 580 |
| PHOTOCATALYST SUBSTANCE | | $TiO_2$ | ZnO | $SrTiO_3$ | $TiO_2$ |
| EXPERIMENTAL HEATING TEMPERATURE (°C) | | 400 | 500 | 450 | 350 |

FLOW OF FLUID (b)

(c)

| | | EXAM. 1 | EXAM. 2 | EXAM. 3 | EXAM. 4 | EXAM. 5 | COM. 1 |
|---|---|---|---|---|---|---|---|
| C O M P O S I T I O N | SiO$_2$ (wt%) | 66.6 | 56.6 | 52.8 | 58.8 | 36.0 | 72.5 |
| | Al$_2$O$_2$(wt%) | 6.0 | 16.9 | 22.0 | 22.3 | 3.0 | 2.0 |
| | B$_2$O$_3$ (wt%) | 25.0 | 11.1 | 6.7 | 1.5 | 3.0 | 0.0 |
| | MgO (wt%) | 0.0 | 1.6 | 14.7 | 4.9 | 3.0 | 0.0 |
| | CaO (wt%) | 0.0 | 4.7 | 0.0 | 0.0 | 10.0 | 12.0 |
| | SrO (wt%) | 0.0 | 2.9 | 0.0 | 0.0 | 3.0 | 0.0 |
| | BaO (wt%) | 0.0 | 5.1 | 0.0 | 0.0 | 32.0 | 0.0 |
| | ZnO (wt%) | 0.0 | 0.0 | 2.5 | 10.0 | 0.0 | 0.0 |
| | La$_2$O (wt%) | 0.0 | 0.0 | 0.0 | 0.0 | 5.0 | 0.0 |
| | ZrO$_2$ (wt%) | 0.0 | 0.0 | 0.0 | 0.0 | 5.0 | 0.0 |
| | Li$_2$O (wt%) | 1.0 | 0.0 | 0.0 | 0.0 | 0.0 | 0.0 |
| | Na$_2$O (wt%) | 2.0 | 0.0 | 0.0 | 2.5 | 0.0 | 13.5 |
| | As$_2$O$_3$(wt%) | 0.0 | 1.1 | 1.3 | 0.0 | 0.0 | 0.0 |
| TRANSMITTIVITY (365nm)(%/cm) | | 90 | 88 | 88 | 85 | 82 | 70 |
| WEIGHT DECREASE OF SALAD OIL AFTER 1-HOUR ULTRAVIOLET IRRADIATION (mg/cm$^2$ · h) | | 0.02 | 0.03 | 0.02 | 0.03 | 0.02 | MEASUR-ABLE LIMIT OR-LESS |

FIG. 26

GLASS MATERIAL FOR CARRYING A PHOTOCATALYST, FILTER DEVICE USING THE SAME AND LIGHT IRRADIATING METHOD

This is a national stage application of JP97/00623 filed Feb. 28, 1997.

TECHNICAL FIELD

The present invention relates to a glass material for carrying a photocatalyst, a filter device using the same and a light irradiating method, particularly for improving an efficiency of light irradiation to a photocatalyst and increasing a photocatalyst reaction.

BACKGROUND ART

A photocatalyst reaction is characterized in oxidization reaction using a string oxidizing force produced under light irradiation. Therefore, attempts are positively made to utilize this technique in a filter and applies the technique to water treatment and environmental purifying.

As a filter using a conventional photocatalyst, a filter with $TiO_2$ or another photocatalyst carried on a thermal resistant fiber or a porous substance, a filter with $TiO_2$ or another photocatalyst carried on a metallic mesh, or the like is used. With a light from a luminous source, photocatalyst action is attained.

As specific examples available are a filter provided with a honeycomb cell carrying a photocatalyst inside a reaction container containing a reaction solution and a reaction solvent and an optical fiber for guiding light in the cell (Document 1. Publication of the patent application laid-open No. Hei 5-154387); a filter with a translucent thin film of titanium oxide carried on a flat substrate of a glass, ceramic or another style or on glass beads or ceramic halls for removing toxic substance contained in city water or the like by irradiating a light to the thin film (Document 2. Hashimoto and Fujishima, "Water and Drain" Vol.36 No.10 (1994), p5–11); a filter with photocatalysts carrying titanium oxide powder on a honeycomb carrier positioned at both sides of a luminous source for purifying air inside an automobile or various environments (Document 3. Suzuki, "Toyotta Chuo Kenyasho R&D Review" Vol.28 No.3 (1993.9), p47–56); a filter with a $TiO_2$ pellet positioned inside an annular container having a luminous source in its middle for treating trichloroethylene or another volatile organic chlorine compound (Document 4. Yamazaki, "Chemistry and Industry", Vol.47 No.2 (1994) p152–155); and the like.

However, in either of the aforementioned prior arts, a photocatalyst action is produced with a light from a luminous source slightly apart from a photocatalyst. Therefore, following common problems exist.

(1) If a filter is covered with dirt, dust, sludge or the like, light has difficulty in reaching a photocatalyst, thereby decreasing a catalyst function. For this, very strong ultraviolet rays are necessary. Especially in case of almost black sewage raw water containing a large quantity of substances, light does not reach a photocatalyst, and a photocatalyst reaction is inactivated or only slightly activated, which cot be practically used.

(2) Light strikes portions and does not strike other portions, and only the light struck portions act. To eliminate the disadvantage, a hybrid photocatalyst is prepared by mixing adsorbent and titanium oxide. The portions not struck by light are collected with the adsorbent and moved to the light-struck portions for decomposition. Such a complicated system needs to be designed.

(3) Even when light irradiates a photocatalyst from a luminous source to a photocatalyst, only a slight quantity of the irradiated light can reach the photocatalyst. Most of the light energy is wasted. Therefore, to efficiently irradiate light, the designing of a device is Important. For this, a structure provided with an annular container having inside a photocatalyst and a luminous source in its middle or another complicated structure needs to be designed.

An object of the invention is to provide a photocatalyst filter, its device and a fluid treatment method using the same which can solve the aforementioned prior-art problem and efficiently produce a photocatalyst function by a sample structure of irradiating light f m a support body carrying a photocatalyst directly to the photocatalyst.

Also, to enhance a capacity for treatment such a photocatalyst, a large quantity of light is heretofore introduced to the photocatalyst.

Specifically, the conventional application of the photocatalyst are restricted to the following.

(1) To enhance the capacity, the irradiation of a large quantity of light is devised.

(2) To enhance the capacity, a way of light irradiation is devised.

(3) To enhance the capacity, the increasing of a photocatalyst activity is devised.

(4) The low capacity restricts the application to the commercial goods developed in accordance with the capacity: for example, deodorization (treating a small quantity, with a rate-determining step in diffusion); prevention of pollution (treating a all quantity over a long time period); antibacterial treatment (treating a small quantity: sterilization is impossible) and the like.

In this manner, even when a photocatalyst action is used, the development giving weight to a light quantity restricts enhancement in capacity of a photocatalyst reaction. When there are a large quantity of objects of photolysis, they cannot be treated by the action of a photocatalyst.

The present invention has been developed in the aforementioned background, to provide a photocatalyst filter device and a filtering method which can remarkably enhance a filtering capacity.

Here, as a filter used for filtering gas, liquid or another fluid generally known is a filter having a filtering face vertical to a passage of fluid to be filtered (e.g. the patent application laid-open No. Hei 7-224632); a filter having a filtering face parallel with a passage of fluid (e.g. the patent application laid-open No. 56-129020) or the like.

In the former, to increase a filtering capacity, a filtering area orthogonal to the passage needs to be enlarged. However, if the passage is enlarged in the vicinity of the filter, it is difficult to uniformly hold the fluid pressure exerted to each portion of the filter. Therefore, the collecting density disadvantageously not uniform, and an efficient filtering cannot be attained.

For the latter, since the filtering face is parallel with the passage, it is effective in that the passage does not have to be necessarily enlarged because the latter has a larger filtering area as compared with the former. However, then the fluid to be filtered advances in a filtering portion, the fluid to be filtered is gradually discharged to the outside through the filtering face serving also as the passage. Therefore, there arises a difference in pressure among respective filter portions, which cases a deviation in collecting density. Therefore, a sufficiently efficient filtering cannot be attained.

Also, attempts are being made to apply a photocatalyst reaction to various water treatment, air treatment, and environmental purifying. However, even if the reaction is used in the aforementioned filter, it is very difficult to irradiate light all over the filter.

The invention has been developed in the aforementioned background, and its object is to provide a filter device which can obtain an efficient filtering action and can be effectively given a filter purifying function using a photocatalyst reaction.

When fluid is to be filtered by a filter, generally following three types of filters are used.

The first type is a filter using a short-fibrous fiber (hereinafter referred to as the short-fibrous filter).

The second type is a filter using a long-fibrous fiber (hereafter referred to as the long-fibrous filter). A base material of the filter is in a form of cloth woven with a long-fibrous fiber.

The third type is a filter using particulates (including a porous body), or a porous body formed by sintering the particulates. Alternatively, the filter is formed by filling a filter forming space with the particulates.

However, either of the aforementioned conventional type filters has the following problems. It is difficult to provide a sophisticated filter inexpensively.

First, in the first type of short-fibrous filter, a fiber filling density is changed mainly by adjusting filter holes (mesh). A localized difference in density is easily made. It is difficult to precisely control the mesh. When fluid is passed, the configuration of the mesh is changed, or another problem arises. Therefore, problem is that it is difficult to obtain a sophisticated filter.

In the second type of long-fibrous filter, an intricate process for Raving a long-fibrous fiber into a cloth is necessary, which increases cost. Additionally, a weavable fiber diameter has its limitation. Attainable mesh is restricted. Therefore, there is also a problem that it is difficult to obtain a sophisticated filter.

Further in the third type of filter using particulates (including a porous body), the filter is formed by filling a filter forming space with the particulates. To obtain a filter function, a considerable quantity of particulates are necessary. This raises a problem that a large space is necessary and cost is increase.

Also in the third type of filter, particulates are formed by sintering or another process into a porous filter for use. A considerably quantity of particulates are necessary. This also raises the aforementioned problem that a large space is necessary and cost is increased. Additionally, there arises a problem that the cost required for forming further increases cost.

The invention has been developed by considering the aforementioned problems, and its object is to prove a filter material, its manufacture method and a filter device or the like using the filter material, so that a sophisticated filter can be provided inexpensively.

As a carrier of the aforementioned photocatalyst filter or another photocatalyst, various glasses are used.

However, it is reported that soda lime glass base material is not preferable because of its deteriorated photocatalyst activity. This is probably because sodium ions are diffused in the photocatalyst to form compounds when the photocatalyst is thermally oxidized.

On the other hand, quartz glass has no diffusion of impurities in a photocatalyst and is surely preferable as a photocatalyst carrying base material. H its manufacture cost is high for practical use. Also, glass has such a high softening temperature that it is difficult to be hot-,worked into various configurations. Cost is further increased.

Further, attempts are made of coating a surface of soda lime glass with quartz glass to suppress sodium from eluting. However, a thin film cannot provide a sufficient effect, while cost is required for forming the thin film, which is undesirable.

The invention has been developed by considering the aforementioned circumstances, and its object is to provide a photocatalyst carrying glass material which has no diffusion of impurities in a photocatalyst, therefore, has its photocatalyst activity not deteriorated, further can be provided inexpensively.

In addition to the aforementioned photocatalyst filter, in case of photo reaction and thermal reaction using light or other cases, light needs to efficiently irradiate a matter to be irradiated. However, according to the invention, a light irradiating method and its device can be applied particularly when light irradiates a photochemical reaction system, or thermal energy is transmitted to a chemical reaction system.

When light irradiates the photochemical system, in most cases, light is irradiated from a single direction. Also, photo-reaction starts from photo-absorption on a surface of a reactant.

In case of thermal reaction, heating is performed directly with a heater or atmospheric heating is performed. In either heating method, thermal reaction starts from a surface close to a thermal source.

In case of combustion reaction, source fire is used, or atmospheric heating is performed. Also in this case, combustion reaction starts from a portion of a reactant close to source fire. In the atmospheric heating, the reaction starts from a surface of the reactant.

In case of conventional photo-reaction, since an exposed surface of a reactant is limited, a tire lag is caused in starting reaction between a portion near the surface and a portion far from the surface. Also, since the exposed surface of the reactant is limited, reaction advances only in a surface portion. Further, when the reactant has a high t n, light has difficulty in reaching the reactant, therefore an intense light needs to be irradiated. Also, w either side of the reactant has a solid phase, to irradiate much light to the solid phase, a luminous source is arranged in multiple directions or the structure needs to be complicated otherwise.

On the other hand, in case of conventional thermal reaction (combustion reaction), in the same manner as in photo-reaction, since an exposed surface of a reactant is limited, a time lag is caused in starting reaction between a portion near the surface and a portion far from the surface. Also, since the exposed surface of the reactant is limited, reaction advances only in a surface portion. Also, to enhance the heat conduction efficiency, sufficient stirring is always necessary. When there arises a temperature gradient in the reactant, a partial difference in reaction is caused. Further in the conventional thermal reaction, since heating is performed using heat conduction and convention, it is difficult to control a constant temperature. It is also difficult to prepare many surfaces.

The invention has been developed to solve the aforementioned problems, and its object is to provide a light irradiating method and its device which basically supplies light and heat through a light guiding body, and promotes photochemical reaction and efficiently transmits heat energy by means of a structure with the light guiding body itself as an irradiator

DISCLOSURE OF THE INVENTION

The objects of the invention are achieved by constitutions of the invention recited in claims. The invention recited in each claim is closely interrelated.

According to the present invention a novel photocatalyst filter is provided by forming a photocatalyst layer on the surface of a light guiding filter body, preferably a glass fiber support, to receive light for the activation of the photocatalyst.

Further a light irradiating method is provided by said filter device.

The photocatalyst filter according to the invention is constituted in such a manner that a photocatalyst is carried on a surface of a light guiding body for guiding light needed to activate the photocatalyst, and the light guided by the light guiding body irradiates directly from a surface of the light guiding body the photocatalyst.

When the light necessary for activation irradiates the photocatalyst, the photocatalyst causes a photalyst reaction, produces a strong oxidizing force and a reducing force on its surface and fulfills a capacity of decomposing and removing a substance contacting the photocatalyst.

As said light guiding body, at least one material selected from the group consisting of glass, ceramic, plastic and crystal which does not react with the photocatalyst itself can be used.

Said light guiding body can be formed in either one or two or mire configurations of a fiber, a honeycomb, a mesh, a cloth, a layer and a cotton.

The photocatalyst is preferably transparent relative to the light necessary for its activation, or can be opaque. In case of an opaque photocatalyst, a large number of photocatalysts are carried like islands on the surface of the light guiding body, so that the light emitted from the portion carrying no photocatalysts of the surface of the light guiding body surrounds peripheries of the opaque photocatalysts.

As said photocatalyst, one or two or more can be used from titanium oxide, iron oxide or its compound, zinc oxide or, ruthenium oxide or its compound, cerium oxide, tungsten oxide or its compound, molybdenum oxide, cadmium oxide or its compound, and strontium oxide or compounds which generate any of these oxides.

The photocatalyst layer may be applied by means of a sol-gel method, a peraeosol method, a wash/coat method, an evaporation method, a sputtering method, a thermal decomposition method, a metal oxidizing nod or the like. By using one or two or more of these method, the surface of the light guiding body is covered with a 1 nm to 1 mm thick film.

Also, to the photocatalyst, an additive for reinforcing a photocatalyst active layer, reinforcing an a strength, reinforcing a stability, reinforcing a photo-reaction or providing another action can be added or used as an undercoat. As a substance, Cr, Ag, Cu, Au, Pt, Ru, Pd, Rh, Sn, Si, In, Pb, As, Sb, P or another metal, its oxide or its compound can be used. To enhance the adherence strength, instead of adding the additive, as a substrate layer of a catalyst layer, Cr, In, Sn, Si, P or the like can be provided.

Materials of the photocatalyst and the light guiding body are selected by considering a refractive index. Different from an optical fiber enclosing light in a core, light needs to be emitted at the side of the photocatalyst as a covering material. As compared with the material of the light guiding body, a photocatalyst having a larger refractive index may be selected.

Further, the photocatalyst filter according to the invention can be structured in such a manner that partially or wholly on an optical fiber having a clad provided on an outer periphery of a core constituting said light guiding body, a core exposed portion lacking said clad is formed, and on the core exposed portion, a photocatalyst having a higher refractive index than the core is carried.

The pbotocatalyst filter of said constitution and a luminous source for injecting light to said photo guiding body can be combined to form a photocatalyst filter device.

For a luminous source, when the photocatalyst is $TiO_2$, its wavelength is preferably in an ultraviolet range of 200 nm to 500 nm which can activate the photocatalyst. A mercury lamp or an ultraviolet lamp for outputting a continuous light can he used. Light from the luminous source may be injected to the light guiding body in one direction or two or more directions.

The photocatalyst filter device according to the invention is a photocatalyst filter device for removing particles matter captured by a filter constituted of a filter material carrying a photocatalyst by using a photolysis reaction of said photocatalyst, and is provided with a heating means for heating said captured matter and/or said photocatalyst.

By combining this filter device with a luminous source for supplying light to a photocatalyst carried on said filter material, a fluid to be filtered is filtered with a filter of said photocatalyst filter device, and light irradiates from said luminous source said photocatalyst for photolysis of the matter captured by said filter, he by heating said captured matter and/or said photocatalyst with said heating means, carbon included in the captured matter is oxidized and gasified, so that the captured matter can be removed.

Said filter material can be constituted of one or two or more selected from the group consisting of glass, ceramic, crystal, metal and plastic. A heating temperature with said heating means is usually selected from 50 to 650° C. For glass as the filter material, the selected temperature is a glass transition point or less: for ceramic, a decomposition point or less; for plastic, the lower temperature of a melting point and a decomposition point of its crystal or less; and for metal, a melting point or less, respectively.

Said filter material can be formed in a structural body of one or two or more configurations selected from the group consisting of a fiber, a honeycomb, a mesh, a cloth, a layer, a cotton and a particulate.

Also, the filter device according to the invention is a filter device using as a filter material an aggregate formed by bundling a large number of long-fibrous bodies aligned in a longitudinal direction, an elongate structural body is formed of said filter material and has one end the open and the other end closed the opening with having its size gradually reduced in longitudinal direction toward the other end, and the matter to be filtered flows through the elongate body via said opening.

Said long-fibrous body partially or wholly forms a wave form in the longitudinal direction.

Also, on a surface of said long-fibrous body, protrusions can be formed.

Said long-fibrous body is partially or wholly constituted of a light guiding material, and may have a photocatalyst partially or wholly formed on its surface.

Further, by introducing light from one end of said long-fibrous fibrous into said long-fibrous body and supplying light to the photocatalyst formed on the surface of said long-fibrous body, a photocatalyst action is produced, so that matters sticking to the surface of said long-fibrous body can be decomposed/removed.

The filter device can be constituted of one or two types or more of an extra fine glass fiber with a diameter of 1 to 70 microns.

Said extra fine glass fiber can be constituted as a structural body of one or two or more configurations selected from the groups consisting of a bundle, a mesh, a cloth, a layer and a candle.

Further in said filter device, a softening point of said extra fine glass fiber is preferably 700° C. or more.

Further in said filter device, partially or wholly on a surface of said extra fine glass fiber, a photocatalyst is formed.

Further in said filter device, by introducing light from one end of said extra fine glass fiber into said extra fine glass fiber and supplying light to the photocatalyst formed on the surface of said extra fine glass fiber, a photocatalyst action is produced, so that matters sticking to said extra fine glass fiber can be decomposed/removed.

In said filter device, a first heating means is provided for heating said captured matter.

The filter material of the filter according to the invention has a constitution with protrusions formed on the surface of the filter base material.

A manufacture method of the filter material according to the invention is constituted in such a manner that protrusions are formed on the surface of the filter base material.

For a manufacture method of a filter material of the invention, said manufacture method of the filter material of the invention has:

a constitution of forming protrusions by fixing particulates on a surface of a filter base material;

a constitution of forming protrusions by using a metallic mold on the surface of the filter base material; or a constitution of forming protrusions on the surface of the filter material by mixing materials in a filter raw base material and shaping.

The filter device of the invention is constituted by using a filter material with protrusions formed on its surface.

A pitch of said protrusion is 2d to 20d, preferably 3d to 10d relative to a diameter d of a long-fibrous body, and a diameter of the protrusion is selected from the range of 0.3 to 100 µm.

Further, the filter device of the invention is constituted by using the filter material with protrusions formed on its surface and said filter material partially or wholly carrying a substance for promoting a catalyst or a surface reaction, or constituted by using the filter material having a light guiding property with protrusions formed on its surface, said filter material partially or wholly carrying a photocatalyst, so that the light irradiated to the filter material and guided via the inside of the filter material irradiates the photocatalyst.

According to the invention, by changing a size of protrusions or a distribution density of protrusions, vacancy (mesh) can be easily controlled with high accuracy. Also, a filter can be obtained only by bundling or laminating the filter material with protrusions formed thereon. Therefore, a not-conventional sophisticated filter can be obtained inexpensively.

Also, since holes or gaps are obtained by the protrusions formed on the surface of the filter material, the holes or gaps remain unchanged even when fluid is passed, and vacancy can be maintained over a long time period. Therefore, the performance as a filter can be maintained over a long time period.

Further, in the invention, a weaving process is basically unnecessary. Even a long-fibrous fiber with a fiber diameter heretofore difficult to be used as a long-fibrous filter can be used as a filter material.

Also, since protrusions are formed on the surface of the filter material, as compared with the filter material having no protrusions, an efficiency can be enhanced in a filter having a function of purifying fluid by using a surface reaction.

A photocatalyst carrying glass material used as the filter or the light guiding body of the filter device according to the invention contains 30 to 80% of $SiO_2$ and 0 to 10% of alkali component in terms of weight %, and is constituted of a low-alkali silicate glass, an alumino-silicate glass, a borosilicate glass or a non-alkali glass.

Also, the photocatalyst carrying glass material of the invention contains, in terms of weight %, 30 to 80% of $SiO_2$, 1 to 35% of $Al_2O_3$, 0 to 30% of $B_2O_3$, 0 to 20% of MgO, 0 to 20% of CaO, 0 to 20% of SrO, 0 to 40% of BaO, 0 to 20% of ZnO, 0 to 10% of $Li_2O$, 0 to 10% of $Na_2O$, 0 to 10% of $K_2O$, 0 to 10% of $Cs_2O$, 0 to 10% combined content of $Li_2O+Na_2O+K_2O+Cs_2O$ and 0.1 to 65% combined content of $MgO+CaO+SrO+BaO+ZnO+Li_2O+Na_2O+K_2O+Cs_2O$.

Further, the photocatalyst carrying glass material of the invention contains, in terms of weight %, 30 to 60% of $SiO_2$, 1 to 20% of $Al_2O_3$, 0 to 20% of $B_2O_3$, 0 to 20% of MgO, 0 to 20% of CaO, 0 to 20% of SrO, 0 to 40% of BaO, 0 to 20% of ZnO, 1 to 60% combined content of $MgO+CaO+SrO+BaO+ZnO$, 0 to 10% of $Li_2O$, 0 to 5% of $Na_2O$, 0 to 5% of $K_2O$, 0 to 5% of $Cs_2O$, 0 to 5% of combined content $Li_2O+Na_2O+K_2O+Cs_2O$ and 1 to 60% combined content of $MgO+Cao+SrO+BaO+ZnO+Li_2O+Na_2O+K_2O+C_2O$.

For the photocatalyst carrying glass material of the invention, said photocatalyst carrying glass material contains as other components at least one component selected from the group consisting of PbO, ZrO, $Tio_2$, $As_2O_3$, $Sb_2O_3$, $SnO_2$, $La_2O_3$, $P_2O_5$, $WO_3$, $Bi_2O_3$, $Ta_2O_5$, $Nb_2O_5$, $Gd_2O_3$ and F.

Alternatively, a transmittivity in a wavelength for activating a photocatalyst is 75% or more at a thickness of 10 mm.

The invention uses the glass composition having no diffusion of impurities in the photocatalyst, having photocatalyst activity not deteriorated, having a photocatalyst thin film easily formed thereon, being superior in chemical durability, transparency and the like, and able to be manufactured inexpensively, and is, therefore, superior as the photocatalyst carrying glass material.

Further by adjusting the position, a fine fiber can be easily obtained, and a photocatalyst carrying glass material superior in heat resistance and other properties can be obtained inexpensively.

First as the aforementioned photocatalyst filter, and as a light irradiating method applicable when light needs to efficiently irradiate an object to be irradiated, the invention provides a light irradiating method in which a highly refractive substance having a higher refractive index than a light guiding body is carried on a surface of said light guiding body, and light guided by the photo guiding body and leaking from said highly refractive substance irradiates the object to be irradiated.

Said light guiding body is constituted of at least one material selected from glass, ceramic, plastic and crystal.

Said light guiding body is formed in either one or two or more configurations of a fiber, a honeycomb, a mesh, a cloth, a layer and a cotton.

Also in the light irradiating method according to the invention, partially or wholly on an optical fiber having a clad provided on an outer periphery of a core, a core exposed portion lacking said clad is formed, and on the core exposed portion, said highly refractive substance is carried, so that the light guided in the core and leaking from said highly refractive substance irradiates to the object to be irradiated.

Said highly refractive substance is constituted of at least one or more materials selected from glass, ceramic, plastic and crystal.

Also in a light irradiating device according to the invention, on a surface of a light guiding body, a highly refractive substance having a higher refractive index than said light guiding body is carried, and the light guided by the light guiding body and leaking from said highly refractive substance irradiates the object to be irradiated.

Further in a filter device according to the invention, on a surface of a light guiding body, a highly refractive substance having a higher refractive index than said light guiding body is carried.

The light guided by the light guiding body leaks from said highly refractive substance, and the leaking light burns collected matters.

Further in a ultraviolet sterilizing device according to the invention, on a surface of a light guiding body, a highly refractive substance having a higher refractive index than said light guiding body is carried.

The ultraviolet ray guided by the light guiding body leaks from said highly refractive substance, and the leaking ultraviolet light sterilizes matters to be sterilized.

Then, in the aforementioned respective inventions, when light necessary for each reaction is irradiated, a reaction system, in response to the light, produces a photo-reaction, a thermal reaction, a combustion reaction or the like. As a luminous source wavelength, a visible ultraviolet ray can be used in the photo reaction, an infrared ray can be mainly used in the thermal reaction and an intense visible infrared ray can be mainly used in the combustion reaction. Light from the luminous source may be injected to the light guiding body in one direction or two or more directions.

As a carrying method of a highly refractive substance used is a sol-gel method, a peraerosol method, a wash/coat method, an evaporation method, a sputtering method, a thermal decomposition method, a metal oxidizing method, a double crucible method, a rod in tube method or the like. By using one or two or more of these methods, the surface of the light guiding body is covered with a 1 nm to 1 mm thick film.

Also, to the highly refractive substance, an additive for providing light selection, reinforcing an adherence strength, reinforcing a stability, reinforcing a photo-reaction or providing another action can be added or used as an undercoat. As a substance, Cr, Ag, Cu, Au, Pt, Ru, Pd, Rh, Sn, Si, In, Pb, As, Sb, P or another metal, its oxide or its compound can be used. To enhance the adherence strength, instead of adding the additive, as a substrate layer of a highly refractive substance layer, Cr, In, Sn, Si, P or another metal, its oxide or its compound can be provided.

BRIEF DESCRIPTION OF THE DRAWINGS

FIG. 13 is a view showing a composition and the like of a fibrous body carrying a photocatalyst in a table.

FIG. 26 is a view showing a composition and the like of a photocatalyst carrying glass material in a table.

BEST MODES FOR OPERATING THE INVENTION

Figure 1:
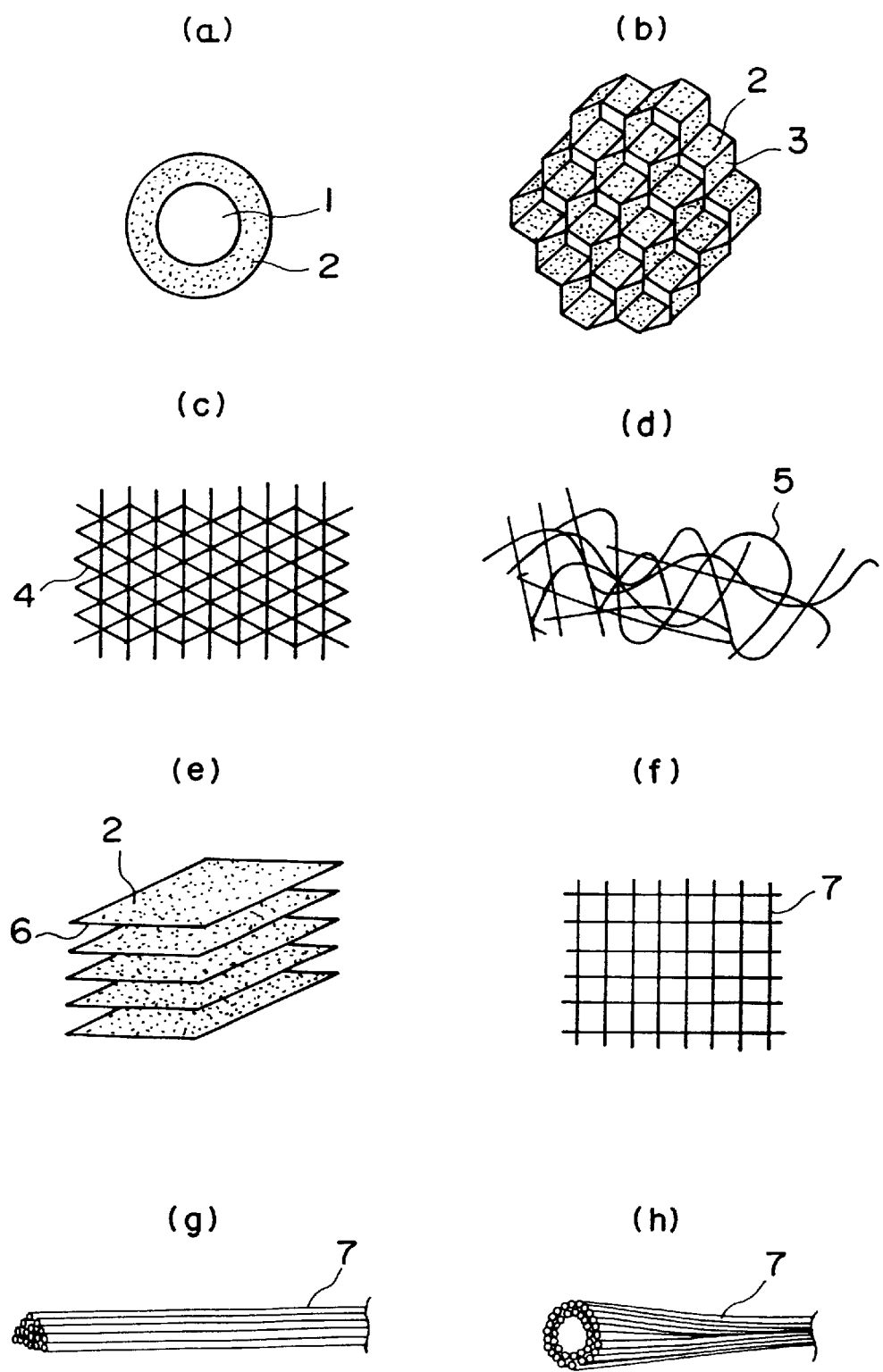
FIG. 1 is an explanatory view showing a constitution of each type of photocatalyst filter.

Modes of operation of the invention are now described. FIG. 1 is an explanatory view showing constitutions of various types of a photocatalyst filter.

(a) is a fibrous filter with a photocatalyst 2 corresponding to a clad carried on a surface of a light guiding body 1 corresponding to a core of an optical fiber (hereinafter, referred to as a photocatalyst fiber or a fibrous body); (b) is a filter with the photocatalyst 2 carried on a surface of a light guiding body 3 shaped in a honeycomb; (c) is a filter of a photocatalyst fiber 4 woven in a mesh; (d) is a filter of a photocatalyst fiber 5 formed in a mass like a cotton; (e) is a filter with photocatalysts 2 carried on surfaces of sheets of light guiding bodies 6 laminated in layers; (f) is a filter in a form of cloth woven with a photocatalyst fiber 7; (g) is a filter of the photocatalyst fiber 7 bundled in parallel; and (h) is a filter of the photocatalyst fiber 7 bundled with a circular clearance portion formed in its central portion for introducing a fluid to be filtered via the clearance portion.

To form the photocatalyst fiber, a known technique for manufacturing optical fiber can be used. For the light guiding body in a form of sheet, a known technique for manufacturing a glass plate can be used. Also, to form the light guiding body in a honeycomb, raw material of glass or the like is granulated and compacted in a honeycomb, or a hollow light guiding body is worked and shaped in a honeycomb.

For the photocatalyst, a typical $TiO_2$ or another semiconductor can be used. As a material of the light guiding body, glass, ceramic, plastic or crystal is available: especially, glass is preferable. Preferable is a glass material having a good ultraviolet-ray transmittance, a less quantity of alkali and a good devitrification resistance.

Ends of the aforementioned light guiding bodies 1, 3, 6 and the photocatalyst fibers 4, 5, 7 form an incident portion for letting in light. To the incident portion, the light from a luminous source (not shown) needed to activate the photocatalyst, e.g. a visible ultraviolet ray is injected.

The light guiding bodies 1, 3, 6, which are transparent relative to the light necessary for activating the photocatalyst 2, introduces the light necessary for activation of the photocatalyst 2, while emitting a part of the light from the surface of the light guiding body. Therefore, the light guiding body 1, 3 or 6 is a support body of the photocatalyst 2, while being a wave guiding passage for passing the light causing a photocatalyst reaction.

A photocatalyst filter device is formed of the aforementioned photocatalyst filter and the luminous source, and disposed in an environment which requires to be purified. Then, the light introduced from the luminous source to the light guiding body and emitted from the surface of the light guiding body irradiates directly the photocatalyst 2, without passing any space or debris. The photocatalyst 2 with the light irradiated thereto raises a photocatalyst reaction, produces a strong oxidizing and a reducing force on its surface, and decomposes and removes substances collected by the photocatalyst from the environment.

As the substances in gas which can be collected for decomposition and removal, fume, dust, atmospheric dust, cigarette smoke, particulate, virus, bacteria and the like are available. Also, gas odor and toxic gas can be removed. As substances included in a solution, sludge, organic substance, trihalomethane and the like are available.

As aforementioned, according to the operation mode of the invention, the photocatalyst receives light directly from the light guiding body as the support body of the photocatalyst, not from the outside far from the photocatalyst, to produce a photocatalyst action. Therefore, even if the filter is covered with dirt, dust, sludge or the like, light can irradiate the photocatalyst. Therefore, without deteriorating a catalyst function, purification is possible even in treatment of black waste liquid. Also, since light reaches the photocatalyst via the light guiding body, as compared with when irradiated from the outside, most of the light energy from the luminous source can be effectively irradiated to the photocatalyst. An intense ultraviolet ray is unnecessary, or the luminous source does not become large-scaled.

Also, when thin photocatalysts are carried on the surface of the light guiding body, light can irradiate all the photocatalysts, so that the system can be designed simply and easily. Further, only by pulling around the light guiding body, the luminous source can be secured and light can be securely irradiated, thereby simplifying a structure of the filter device.

Next a specific example in which the photocatalyst filter is applied to a diesel particulate filter (DPF) is described.

Exhaust gas of a diesel engine contains solid granulated matters (particulates) consisting of black smoke, unburnt hydrocarbon and lubricating oil. The particulates are generated by incomplete combustion of hydrocarbon in fuel. If the particulate exists in exhaust gas, it becomes black smoke and is discharged in large quantities to the atmosphere as it is, which is not preferable for the environment. Therefore, to remove or minimize particulates in exhaust gas, particulates are collected with an appropriate filter. In the example of the operation mode, the aforementioned photocatalyst filter is used for this purpose.

Figure 2:
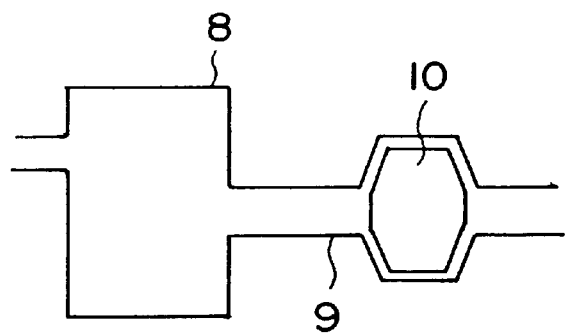
FIG. 2 is an explanatory view showing an exhaust gas purifying device of the invention applied to a diesel particulate filter.

As shown in FIG. 2, a photocatalyst filter 10 is disposed midway in an exhaust pipe 9 behind an exhaust port of a diesel engine 8.

The photocatalyst filter 10 disposed in the exhaust pipe 9 is constituted of a combination of basic units. Fibers are, as shown in FIG. 3(a), cut in predetermined lengths and arranged like blinds to form photocatalyst fibers. A plurality of the photocatalyst fibers 11, a support 12 for supporting one end of the plurality of photocatalyst fibers 11, and a luminous source 13 for injecting the light necessary for activation of the photocatalyst to the supported ends of the photocatalyst fibers 11 constitute the filter.

Two of the basic units are, as shown in FIG. 3(b), rotated 90° or appropriately and disposed in such a manner that the photocatalyst fibers 11 form blind lattices, which is a basic filter. To increase a surface area and a collecting ratio, one or two or more basic filters are used to constitute the DPF.

For the light guiding body constituting the photocatalyst fiber 11 used is an alumino-silicate glass (glass transition point 500 to 800° C.) resistant to a high temperature (100 to 700° C.) exhaust gas or a quartz glass (glass transition point of about 1100° C.). A fiber diameter of the photocatalyst fiber is around between 1 μm and 10 μm. For the photocatalyst, typical $TiO_2$ is used. For the luminous source 13, a visible ultraviolet ray which can activate $TiO_2$, and a ultraviolet lamp for transmitting a continuous light of 300 nm to 400 nm not toxic to a human body are used.

The luminous source 13 is installed outside the exhaust pipe 9. In this case, the luminous source 13 cannot be necessarily disposed in the vicinity of the photocatalyst fiber 11. In this case, the light guiding body needs to be pulled around from a luminous source position to the photocatalyst fiber 11 in the exhaust pipe 9. During pulling around, if light leaks, disadvantage arises. Therefore, for pulling around, by covering the outside of the light guiding body with a clad having a lower refractive index than the light guiding body, the photocatalyst filter is constituted just like a usual optical fiber structure constituted of a core and a clad. In this constitution, the luminous source position is not restricted, thereby facilitating the system design.

However, for the light necessary for activation of the photocatalyst, an optical fiber (constituted of a core and a clad) having a structure in which light easily leaks outside can be used as it is. Additionally, only by disposing the photocatalyst to be carried on a specified position of the optical fiber, a photocatalyst filter can be constituted. Therefore, the system design can further be facilitated.

Figure 4:
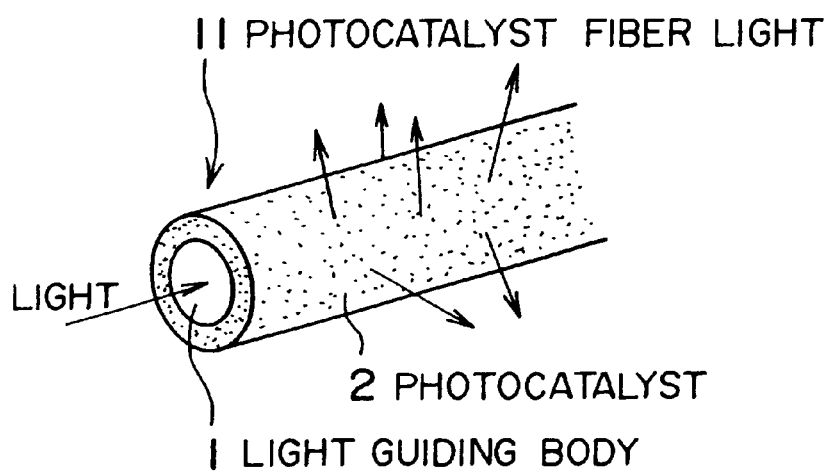
FIG. 4 is an explanatory view showing a photocatalyst fiber according to an example mode of operation of the invention.

The aforementioned photocatalyst fiber 11 can be manufactured, for example, as follows. An alumino-silicate glass using a high-purity raw material is melted in a platinum crucible. The molten glass is shaped into a fiber in a pushing method. Subsequently, a fiber glass is covered with a $TiO_2$ film in a sol-gel method. In this case, by adding an adherence strength reinforcing agent, the adherence strength of the $TiO_2$ film to the surface of the light guiding body, and a protective function of the $TiO_2$ film can further be enhanced. The film thickness is adjusted to 0.5 μm. The structure of the photocatalyst fiber is manufactured as shown in FIG. 4.

The refractive index of the $TiO_2$ film in a visible ultraviolet range is between 2.1 and 2.6, and that of aluminosilicate glass is around 1.5. The refractive index of the $TiO_2$ film corresponding to the clad is higher. Therefore, the light incident from the luminous source upon the photocatalyst fiber 11 and leaking from the surface of the light guiding body 1 directly irradiates the photocatalyst 2. To increase the leakage of light from the surface of the light guiding body, the light guiding body is effectively bent.

As aforementioned, when the photocatalyst filter is used in the DPF, the catalyst function is increased, black smoke, unburnt fuel and lubricating oil in exhaust gas can be highly efficiently collected, and the quantity of black smoke is decreased. Also, the black smoke collected by light irradiation can be decomposed by oxidizing action of $TiO_2$, thereby eliminating the clogging. Therefore, combustion for reuse, indispensable for the conventional DPF, becomes unnecessary, thereby providing a simple and inexpensive mechanism. A long-durable DPF free of maintenance can be realized. Further, since the filter is formed of glass, it can resist a high temperature of diesel exhaust gas.

If to enhance a purifying action, a temperature is raised, to increase a catalyst reaction, platinum or another catalyst coexists, or to increase a collecting efficiency, zeolite, active carbon or the like coexists; if by making differences in photocatalyst fiber diameter among units to be combined, a coarse filter or a sophisticated filter is formed; if the photo density is increased; further if the photocatalyst filter is disposed in multiple steps, then further effect can be obtained.

Also, in the aforementioned example of operation mode, the photocatalyst filter device is applied to the exhaust gas purifying device for removing particulates from exhaust gas of the diesel engine. The invention can be applied to another gas treatment filter (e.g. an air filter for a clean roam, an air cleaner), a solution treatment filter (water or sea water purifying filter) or another environmental problem.

In addition of the light guiding body constituted only of glass, the light guiding body can be a complex of glass, ceramic, plastic or crystal.

According to the operation mode, with a simple structure in which light irradiates directly from the inside of the light guiding body carrying the photocatalyst, light can more efficiently irradiate, as compared with the conventional structure in which light irradiates from the outside slightly apart from the photocatalyst to the photocatalyst. The photocatalyst reaction can be increased. Also, since there is no space or debris between the photocatalyst and the surface of the light guiding body as a light emitting portion, light can reach the photocatalyst even in contact with a black fluid.

Especially, when the photocatalyst filter is constituted in such a manner that the photocatalyst is carried on a core exposed portion of an optical fiber, the photocatalyst filter can be pulled around and the luminous source can be secured further easily.

Also, when the refractive index of the photocatalyst is higher than that of the light guiding body, light can largely leak from the light guiding body. Therefore, the photocatalyst reaction can further be increased.

Further, when the photocatalyst filter device is used in a fluid treatment method, substances to be treated can be decomposed, thereby realizing the free-of-maintenance and a long life.

A second operation mode of the invention is now described.

In a photocatalyst filter device according to the second operation mode, when the light necessary for activation irradiates a photocatalyst, a photocatalyst reaction is raised, a strong oxidizing force and a reducing force are produced on its surface, and the substance contacting the photocatalyst is decomposed and removed. The photocatalyst filter device is provided with a heating mechanism for heating the captured matter and the photocatalyst.

The first characteristics of the operation mode lies in that in the photocatalyst filter device using a photolysis reaction by means of a photocatalyst, by raising a temperature at the time of photocatalyst reaction, the photolysis reaction is promoted. Specifically, it is known from a following equation (1) shown by S. A. Arrhenius that the higher a reaction temperature is, the higher a reaction rate becomes $$k = A \cdot e^{-E_s/RT} \qquad (1)$$

(Provided, in the equation, k denotes a reaction constant, A a frequency factor, E an activation energy, R a gas constant and T a reaction temperature.)

Therefore, in the operation mode, by heating the filter and/or the captured matter, the reaction temperature is raised, and an action of promoting the photolysis reaction is provided (hereinafter, referred to as the photolysis promoting action).

In the operation mode, the photocatalyst is not especially restricted. For example, one or two or more compounds can be selected for use from the group consisting of titanium oxide, iron oxide, zinc oxide, ruthenium oxide, cerium oxide, tungsten oxide, molybdenum oxide, cadmium oxide, and strontium oxide or compounds which generate any of these oxides.

Also, to the photocatalyst, an additive for reinforcing a photocatalyst active layer, reinforcing an adherence strength, reinforcing a photo-reaction or providing another action can be added, or used as an undercoat. As the additive, Cr, Ag, Cu, Au, Pt, Ru, Pd, Rh, Sn, Si, In, Pb, As, Sb, P or another metal, its oxide or its compound can be used. To enhance the adherence strength, instead of adding the additive, as a substrate layer of a catalyst layer, Cr, In, Sn, Si, P or the like can be provided.

The photocatalyst may be uniformly included in a filter material, and is preferably carried on a surface of the filter material constituted of the light guiding body. In the latter case, the light guided by the light guiding body can be emitted from the surface of the light guiding body and directly irradiate the photocatalyst, thereby enhancing the photolysis action.

As a carrying method of the photocatalyst used is a sol-gel method, a peraerosol method, a wash/coat method, an evaporation method, a sputtering method, a thermal decomposition method, a metal oxidizing method or the like. One or two or more methods can be used. When the photocatalyst is carried on the surface of the light guiding body, a covering with a 1 nm to 1 nm thick film is preferable.

The photocatalyst is preferably transparent relative to the light necessary for its activation, or can be opaque. In case of an opaque photocatalyst, a large number of photocatalysts are carried like islands, so that the light emitted from the portion carrying no photocatalysts of the surface of the light guiding body surrounds peripheries of the opaque photocatalysts.

For a luminous source wavelength, when the photocatalyst is Tie, an ultraviolet range of 200 nm to 500 nm which can activate the photocatalyst is preferable. As a luminous source, a mercury lamp or an ultraviolet lamp for outputting a continuous light can be used.

Light from the luminous source may be injected to the light guiding body in one direction or two or more directions. When the filter material is constituted of long fiber, by injecting light to an end of the long fiber, light can reach all the photocatalysts through the long fiber, the photocatalysts can receive directly from the inside of the light guiding body as the support body of the photocatalyst, and produce a photocatalyst action.

The material of the filter used in the operation mode can be appropriately selected in accordance with its purpose. Preferably, the light guiding body does not decompose, melt or soften at a heating temperature described later, and does not react with the photocatalyst. As the material, glass, ceramic, crystal, metal and plastic are available.

Further, the material of the photocatalyst filter device in the operation mode is preferably a material which does not lower the photocatalyst activity. The material not lowering the photocatalyst activity has no impurities diffused to the photocatalyst, does not deteriorate the photocatalyst activity, has a photocatalyst thin film easily formed thereon, is superior in chemical durability, transparency and the like, and is easily worked.

The material contains, in terms of weight %, 30 to 80% of $SiO_2$ and 0 to 10% of alkali component. For example, a low-alkali silicate glass, an alumino-silicate glass, a borosilicate glass and a non-alkali glass are available. Above all, the glass material preferable as the material which does not lower the photocatalyst activity contains, in terms of weight %, 30 to 80% of $SiO_2$, 1 to 35% of $Al_2O_3$, 0 to 30% of $B_2O_3$, 0 to 20% of MgO, 0 to 20% of CaO, 0 to 20% of SrO, 0 to 40% of BaO, 0 to 20% of ZnO, 0 to 10% of $Li_2O$, 0 to 10% of $Na_2O$, 0 to 10% of $K_2O$, 0 to 10% of $Cs_2O$, 0 to 10% of combined content $Li_2O+Na_2O+K_2O+Cs_2O$ and 0.1 to 65% combined content of $MgO+CaO+SrO+BaO+ZnO+Li_2O+Na_2O+K_2O+Cs_2O$.

Reasons for restriction of each opponent are described later.

Further, to the aforementioned glass material which does not lower the photocatalyst activity, in addition to the aforementioned components, in a range which does not deteriorate the aforementioned property, PbO, $ZrO_2$, $TiO_2$, $As_2O_3$, $Sb_3O_3$, $SnO_2$, $La_2O_3$, $P_2O_5$, $WO_3$, $Bi_2O_3$, $Ta_2O_5$, $Nb_2O_5$, $Gd_2O_3$, F or the like can be added for the purpose of improving devitrification resistance, melting property, chemical durability and the like or as a clarifying agent.

The glass material is not especially restricted in its manufacture method. For example, a batch raw material of the aforementioned components is placed in a platinum crucible or another heat resistant container, and heated and melted at 1200 to 1650° C. for about 2 to 4 hours. The molten glass is made uniform by stirring, clarified, then poured into a casting mold to be gradually cooled for manufacture.

For the glass raw material used in the glass material, of either component, hydroxide, carbonate, nitrate, sulfide, oxide, nitride or the like which is usually used as the glass material can be appropriately used.

A filter structural body constituting the photocatalyst filter device in the operation mode is the same as shown in FIG. 1.

For a technique for forming a photocatalyst fibrous body into a wave form or forming protrusions on a surface, various known techniques in each field can be used.

Also, when forming a photocatalyst fiber, a known technique of manufacturing a photocatalyst fibrous body can be used. For a sheet form of light guiding body, a known method of manufacturing a glass plate can be used. Also, to form the light guiding body in a honeycomb, raw material of glass or the like is granulated and compacted in a form of honeycomb, or a hollow light guiding body is worked and shaped in a honeycomb.

Subsequently, the second characteristics of the operation mode lies in that by heating captured matters, the captured matters are thermally deposed or gasified to be removed from the filter. Specifically, as the matters which can be optically decomposed by the photocatalyst action, fume, dust, atmospheric dust, cigarette smoke, particulate, virus, bacteria, toxic gas, sludge, trihalomethane and the like can be decomposed. At the same time, when these are heated at a high temperature, they are thermally decomposed. Alternatively, by reacting the atmosphere of oxygen or the like, the substances are gasified. Therefore, in the invention, by heating these captured matters to a temperature of thermal decomposition and gasification (hereinafter, thermal decomposition or gasification is referred to as "the thermal reaction"), an action of producing a thermal decomposition reaction of the captured matters is provided (hereinafter, referred to as "thermal reaction producing action"). Here, the thermal reaction also indicates that organic substances is once carbonized by heating, then thermally decomposed or gasified. The heating is performed by the heating means provided in the photocatalyst filter device.

The heating means is not especially restricted. For example, heater heating, combustion heating, reaction heat heating, microwave heating, coil heating, lamp heating, resistance heating or another general heating means are available. The heating means is connected to a filter for directly heating the filter, or disposed so as to heat through water or another liquid, atmosphere, oxide or another gas or another medium (hereinafter, referred to just as the medium).

A heating temperature needs to be in a range in which the filter does not lose a function as the photocatalyst filter device. Specifically, the heating temperature is a temperature at which the filter material does not lose a function as the filter, and at which the photocatalyst carried on the filter is neither thermally decomposed, nor gasified by reaction with the medium nor lost from the filter otherwise, nor deteriorated.

As the temperature at which the filter material does not lose the filter function, the heating temperature is a temperature at which the filter material does not react with the medium. When the filter material is of glass, the temperature is a glass transition point or less. In case of ceramic, the temperature is a decomposition point or less. In case of crystal or plastic, the temperature is the lower temperature of the melting point and the decomposition point of its crystal or less. In case of metal, the temperature needs to be a melting point or less. If the heating temperature exceeds such temperature, the filter is melted, deformed or lost, and the filter loses its filter function. Specifically, the heating temperature is in a range of 50 to 650° C., especially preferably 350 to 500° C. If the heating temperature is less than 50° C., a degree of the aforementioned photolysis reaction promoting action is excessively small, and has no difference in practical use from the case heating is not performed. On the other hand, if the heating temperature exceeds 650° C., the captured matters or the like raises a combustion reaction and there is possibility that temperatures cannot be controlled. Here, the heating temperature is a maximum temperature the filter or the captured matters reach when heated. The heating temperature can be selected appropriately from the aforementioned temperature range. In view of the thermal reaction producing action, the heating temperature needs to be a thermal reaction starting temperature or less of the captured matters. To lower the thermal reaction starting temperature of the captured matters, oxygen or the like is included in the medium preferably to gasify. Also, in the respect of catalyst, the photocatalyst has an effect of lowering the thermal reaction starting temperature.

The photolysis reaction promoting action is provided by heating while light irradiates the photocatalyst, while the thermal reaction producing action is provided when the captured matters are captured by the filter. Therefore, the time to heat can be appropriately selected while the captured matters are captured.

For the photocatalyst filter device according to the operation mode, by applying various heating methods, a photocatalyst filter device free of maintenance can be constituted.

FIGS. 8–11 are views showing various modes of the photocatalyst filter device according to the invention.

Figure 8:
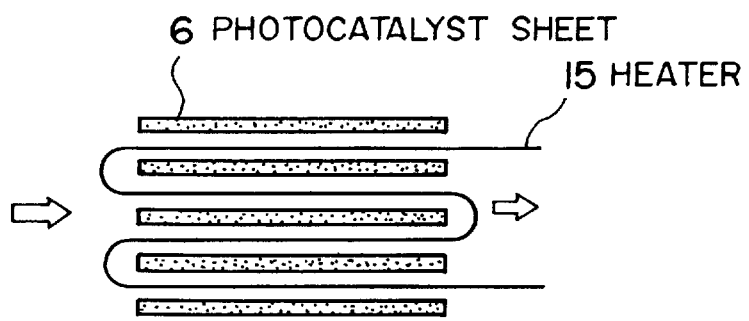
FIG. 8 is a view showing a mode of a photocatalyst filter device of the invention.

In an example shown in FIG. 8, a heating heater 15 is arranged among respective sheets of a laminated body of photocatalyst sheet 6.

Figure 9:
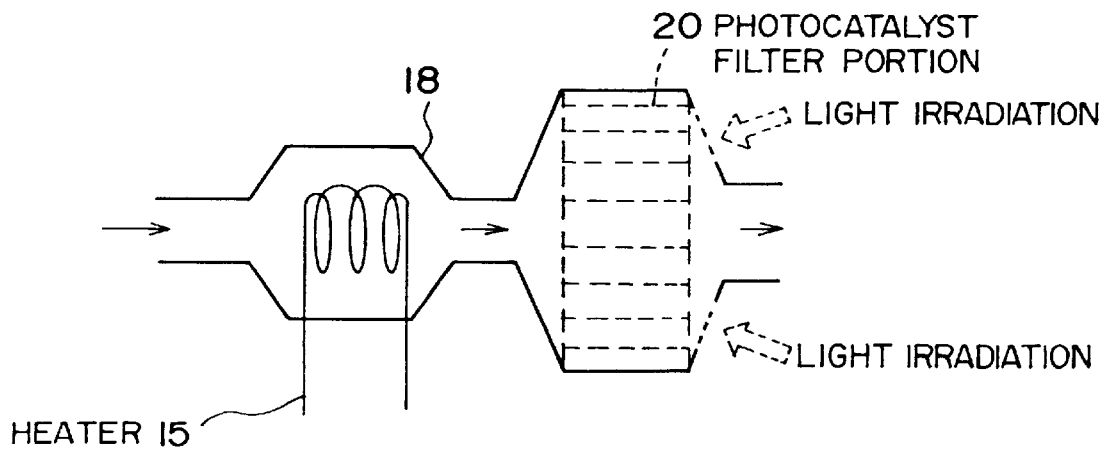
FIG. 9 is a view showing a mode of the photocatalyst filter device of the invention.

In an example shown in FIG. 9, the heater 15 and a photocatalyst filter portion 20 are successively disposed in a passage 18 of the matter to be filtered.

Figure 10:
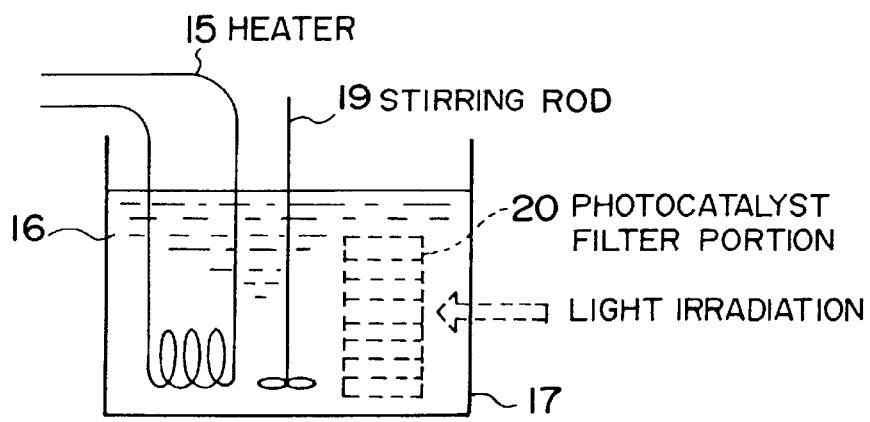
FIG. 10 is a view showing a mode of the photocatalyst filter device of the invention.

In an example shown in FIG. 10, in a container 17 containing turbid liquid 16 as the matter to be filtered, the photocatalyst filter portion 20, the heater 15 and a stirring rod 19 are installed, in such a manner that the turbid liquid 16 is stirred so as to pass the photocatalyst filter portion 20, while the turbid liquid 16 is heated by the heater.

Figure 11:
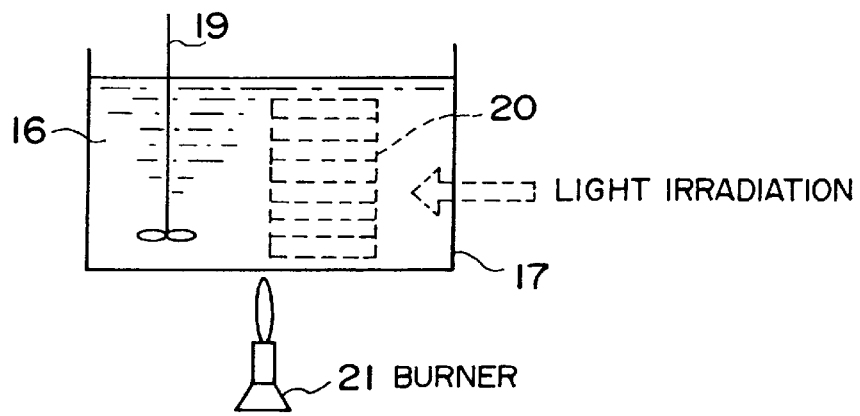
FIG. 11 is a view showing a mode of the photocatalyst filter device of the invention.

In an example shown in FIG. 11, the example shown in FIG. 10 uses as the heating means a burner 21, instead of the heater 15.

As aforementioned, the photocatalyst filter device in the operation mode promotes the photolysis reaction with the photocatalyst, and can further thermally decompose or gasify the captured matters. For this, the photocatalyst filter device of the invention can treat a large volume of captured matters. Therefore, in the photocatalyst filter device in which the photocatalyst filter device of the invention is combined with the luminous source for irradiating light for providing a photocatalyst action can be used as a filter having a large quantity of captured matters, or as a filter device which cannot treat only with photolysis by means of the photocatalyst, or even in an exhaust gas purifying device, such as a diesel particulate filter (DPF) for removing solid granulated matters (particulates) consisting of black smoke, unburnt hydrocarbon and lubricating oil included in exhaust gas from a diesel engine, thereby sufficiently providing its effect.

Also, the photocatalyst filter device in the operation mode has, as aforementioned, a large capacity of removing captured matters, and is also provided with the luminous source for irradiating light to the photocatalyst and the heating means for causing the thermal reaction, further forms a filter device obviating the necessity of maintenance because of its large capacity of removing captured matters. Therefore, in a method of using the photocatalyst filter device of the invention in order to filter fluid, even when matters to be filtered flow in successively, filtering operation needs not to be interrupted for removal of captured matters. Therefore, when the filter device is used as an air filter for a clean room, a gas treatment filter for an air cleaner or the like, or a water or sea water purifying filter or another solution treatment filter, to filter fluid, especially circulating filter, the device can filter fluid almost permanently without maintenance.

In the following, the second operation mode of the invention is further detailed based on an t.

In the embodiment, the photocatalyst filter device according to the second operation mode is used in DPF.

Figure 12:
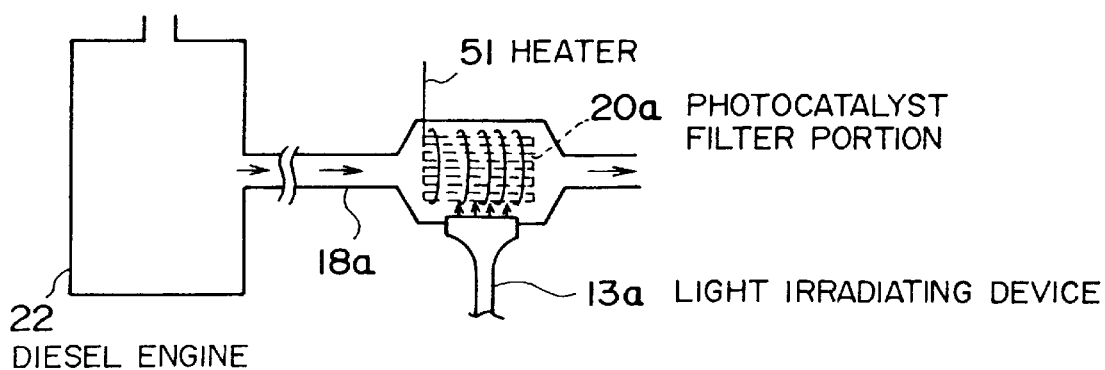
FIG. 12 is a view showing a constitution of a photocatalyst device according to an embodiment of the invention.

As shown in FIG. 12, in the photocatalyst filter device of the embodiment, in an exhaust pipe 18a behind an exhaust port of a diesel engine 22, a filter portion 20a is disposed, the filter portion 20a is provided with a heating heater 51, and a light irradiating device 13a is provided for irradiating light to the filter portion 20a for activating the photocatalyst.

The filter portion 20a is formed by working the glass having the composition shown in a table of FIG. 13 into a long fiber with a diameter of 5 $\mu$m, weaving the long fiber in the sheets of filter shown in FIG. 1(e) by which particulates in exhaust gas from the diesel engine can be captured, and applying $TiO_2$ on the surface of the filter. Alternatively, as the filter portion 20a, a bundle of photocatalyst fibrous bodies with a photocatalyst formed on a surface of a light guiding fibrous body can be used. One end of the bundle is guided to the outside, to which light can be supplied. In this case, for a portion disposed outside, only the outside portion can be formed in an optical fiber in order to prevent light leakage.

Also, as the filter portion 20a, the structure shown in FIG. 1(h) can be used. When the filter of the structure shown in FIG. 1(h) is used, exhaust gas is introduced via an opening. In a converging portion, no photocatalyst is carried on a surface of a light guiding fibrous body, and instead, a clad material is formed in an optical fiber. Subsequently, the converging portion is taken to the outside, from which an activating light may be supplied.

The heating heater 51 is wound around the periphery of the filter portion 20a to be entirely and sufficiently heated. The heater 51 may heat the filter portion 20a as required without obstructing flow of the fluid to be filtered and light irradiation, and may have durability and the like.

The light irradiating device 13a guides light from a not-shown ultraviolet lamp with an optical fiber bundle, and the area of its emitting end is formed large in such a manner that light can entirely irradiate the filter potion 20a. As the light irradiating device 13a, it is natural that another system can be used as long as light can sufficiently irradiate entirely the filter portion 20a.

In the aforementioned device, by driving the diesel engine 22, exhaust gas particulates were discharged at a discharge rate of the order of 0.01 g/s. Upon starting, the light irradiation to the filter and the heating of the heater coil wound around the filter were activated, until the photocatalyst filter portion 20a and the exhaust gas particulates reached the experimental heating temperature in the table of FIG. 13. The temperature was maintained until the engine was stopped. In this case, the heating with the heater coil and the heating using the heat of exhaust gas are used as the heating means. As the luminous source, an ultraviolet lamp emitting a continuous light of 300 to 400 nm was used. After stopping the engine drive, the filter was examined. Then, it was found that exhaust gas particulates hardly adhered to the filter, and the photocatalyst filter device could remove the exhaust gas particulates captured at the rate of the order of 0.01 g/s or more.

Figure 3:
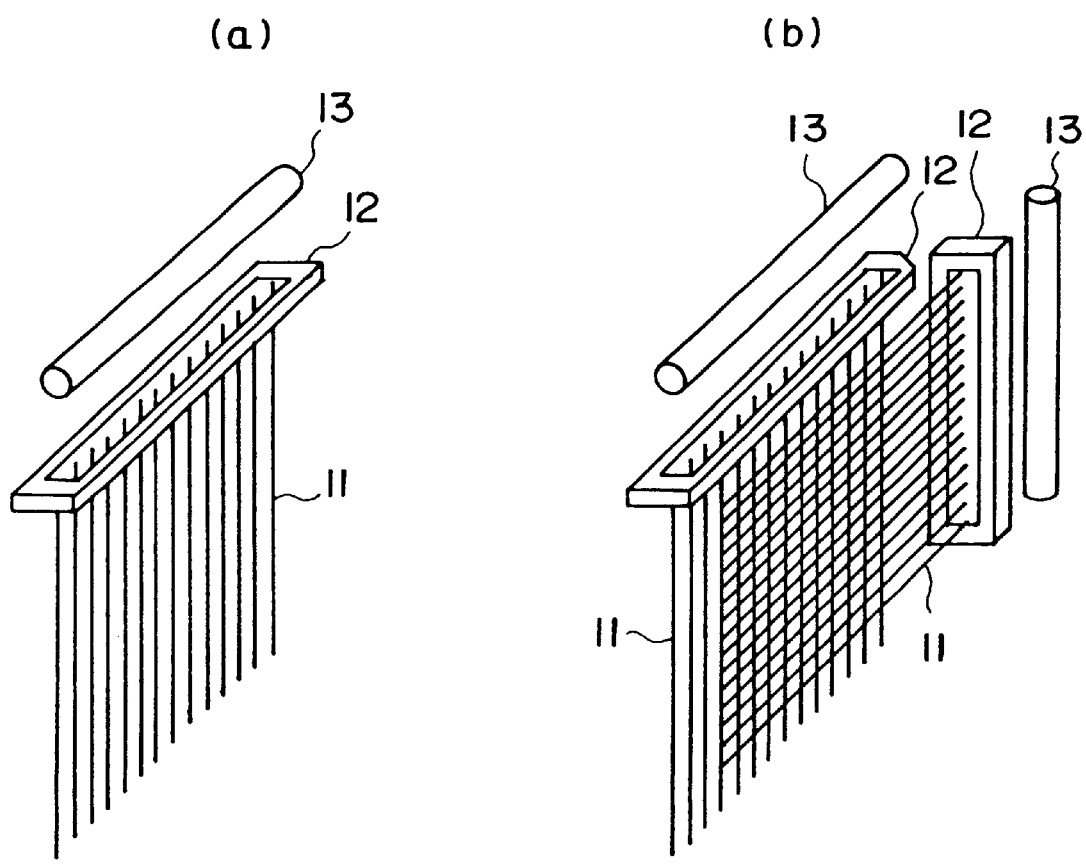
FIG. 3 is an explanatory view showing a photocatalyst filter according to an example mode of operation of the invention: (a) is a constitutional view of a basic unit; and (b) is a constitutional view of a basic filter.

Further, when the distance from the luminous source to a portion for actually providing a filter action needs to be lengthened, as the photocatalyst fibrous body 11 shown in FIG. 3, only for a portion corresponding to the portion for performing the filter action, a photocatalyst is formed on a surface of a light guiding fiber. For the other portions, when the light guiding fiber is used as a core, a clad material is formed on the surface of the light guiding fiber, to constitute an optical fiber. Thereby, light from the luminous source can be effectively guided to the photocatalyst without leaking midway.

The photocatalyst fibrous body 1 was manufactured by melting an alumino-silicate glass using a high-purity raw material in a platinum crucible, shaping the molten glass in a fibrous body in a pushing method, and covering the fibrous body glass with a $TiO_2$ film in a sol-gel method. The thickness of the $TiO_2$ film was adjusted to 0.5 $\mu$m.

Here, the refractive index of the $TiO_2$ in a visible ultraviolet range is between 2.1 and 2.6, and that of aluminosilicate glass is around 1.5. Therefore, in the fibrous body, the portion corresponding to the clad has a higher refractive index than the portion corresponding to the core.

By using such constitution of the photocatalyst filter portion 20a instead of the aforementioned photocatalyst filter portion 20a shown in FIG. 12, a DPF device was manufactured. By using the DPF device, light irradiated the photocatalyst when the diesel engine was started. At the same time, the heater coil caught on the filter started to be heated, until the photocatalyst filter portion 20a and the exhaust gas particulates reached the experimental heating temperature in the table of FIG. 13. The temperature was maintained until the engine was stopped. After the engine was stopped, the filter was examined. Then, it was found that exhaust gas particulates hardly adhered to the filter, and the DPF could remove the exhaust gas particulates captured at the rate of the order of 0.01 g/s or more.

In the aforementioned embodiment, the photocatalyst filter device in the operation mode is applied to the DPF. As the filter constituting the photocatalyst filter device, by using the filter formed in a mesh structural body by weaving the photocatalyst fibrous body 4 as shown in FIG. 1(c), or the filter formed in a cotton of the photocatalyst fibrous body 5 as shown in FIG. 1(d), for example, "the sterilizing device, the device for removing sludge, trihalomethane" or the like can be constituted. In this case, a device having a capacity far exceeding the treatment capacity of the conventional non-heating device can be obtained. Further, the device can be far superior in a cleaning capacity for removing dead bacteria and the like.

The aforementioned photocatalyst filter device of the embodiment promotes the photolysis reaction by means of the photocatalyst by raising a reaction temperature. Therefore, the photocatalyst filter device, as compared with the conventional system in which only the quantity of introduced light is increased, provides a remarkably enhanced photocatalyst action and increases the removal quantity of captured matters. Also, in the photocatalyst device in the operation mode, the captured matters of the filter can be thermally decomposed or gasified to be removed. Therefore, when the photolysis is promoted and the thermal decomposition reaction is raised, a large quantity of captured matters can be removed. Also, in the photocatalyst filter device in the operation mode, with the captured matters captured by the filter, both the aforementioned photolysis promoting action and the thermal reaction producing action are provided. Therefore, while captured matters are captured by the filter, a large quantity of captured matters can be removed, thereby realizing the filter free of maintenance. Therefore, in the operation mode, the photocatalyst filter device free of maintenance can be realized. In a method of treating matters to be filtered of fluid using the photocatalyst filter device in the operation mode, different from the conventional filter, the filtering process needs not to be interrupted so as to remove captured matters. Even when the matters to be filtered as fluid flow in successively, treatment can be made almost permanently.

A third operation mode of the invention is now described.

Figure 14:
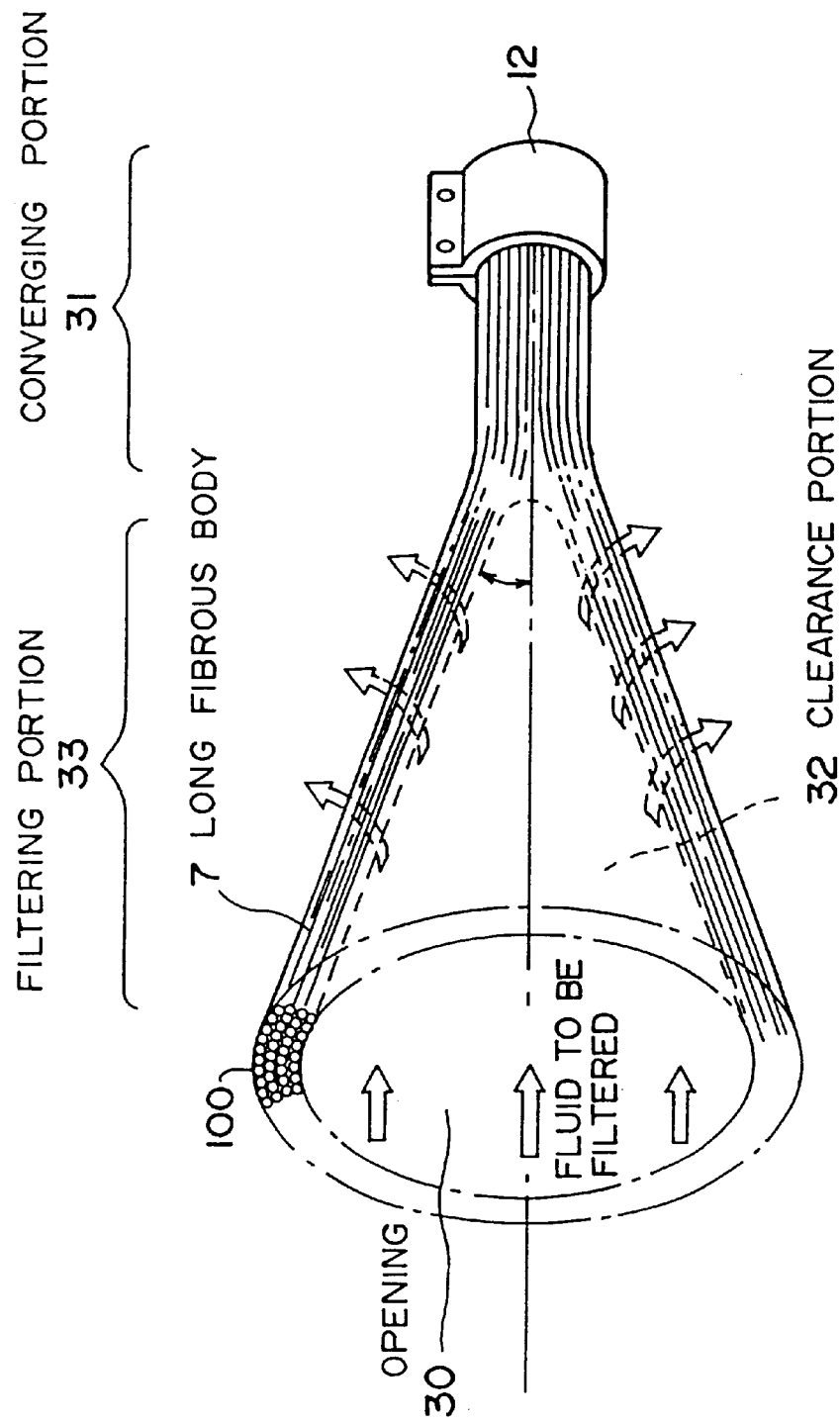
FIG. 14 is a diagrammatic perspective view of a filter device according to a made of operation of the invention.

FIG. 14 is an explanatory view of a filter device 100 according to the third operation mode of the invention. In the following, referring to FIG. 13, the third operation mode of the invention is described.

The filter device in the operation mode is constituted as a filter material of an aggregate formed by bundling a large number of long-fibrous bodies 7. The material of the long-fibrous body 7 constituting the filter material is, for example, glass, ceramic, glass ceramic, metal, plastic, crystal or the like. The material is not especially restricted as long as it is a light guiding body which can be used as the filter material.

The diameter of the long-fibrous body 7 can be selected appropriately, and is preferably 1 to 200 $\mu$m. If the diameter is less than 1 $\mu$m, the strength of the fiber itself is lacking. When light is introduced from an end face, its efficiency is deteriorated. On the other hand, if the diameter exceeds, for example, 200 $\mu$m, the ratio of the surface area providing a filter function relative to the volume occupied by the filter is remarkably reduced, which is not practical.

The length and number of the long-fibrous bodies 7 are not especially restricted, and can be appropriately selected according to the purpose. Also, the lengths of all the long-fibrous bodies 7 can be the same or can be changed as required.

In the filter device in the operation mode, a large number of long-fibrous bodies 7 form at one end an opening 30 as an inflow port of matters to be filtered, and form at the other bundled end a converging portion 31. Therefore, in the filter device according to the operation mode, a portion surrounding a clearance portion 32 formed from the opening 30 to the converging portion 31 (hereinafter, referred to just as "the clearance portion") constitutes a filtering portion 33 for providing a filtering action.

When the structure of the filter material constituting the filter device is as aforementioned, the filtering area of the filtering portion 33 can be enlarged. When the clearance portion 32 as the passage of the fluid to be filtered is gradually narrowed toward its depth (tip), a drop in pressure of flowing fluid is compensated to some degree, and a difference in pressure between respective positions on the inner peripheral face of the filtering portion 33 is reduced. Therefore, deviation in collecting can be advantageously eased.

As a method of bundling the long-fibrous bodies 7, the bodies can be fastened with a holder 12 or the like, adhered to one another with an adhesive or the like, thermally fused or otherwise. However, the method is not restricted to these.

In the filtering portion 33, the long-fibrous body 7 can be substantially straight or curved. In view of a uniform collecting efficiency, the substantially straight configuration is preferable. Also, the bend angle θ of the long-fibrous body 7 in the filtering portion 33 relative to the central axis direction of the long-fibrous body 7 in the converging portion (hereinafter, referred to simply as "bend angle θ") can be appropriately selected. Specifically, θ at which the collecting efficiency is maximized changes with the magnitude of pressure loss. However, an excessively large bend angle results in excessive light leakage, and an excessively small θ enlarges the size of the device. Therefore, the bend angle is preferably 5 to 15°.

Also, the opening 30 can be circular, elliptical, polygonal or in another configuration. When the opening 30 is circular, the filtering portion has a substantially conical side wall, which enhances the collecting efficiency. By forming the opening like a star, especially a polygonal star, the surface area of the filtering portion can be enlarged and the pressure loss can be reduced. The opening is not necessarily one.

As a method of forming the clearance portion 32 having the opening 30, into the bundled aggregate of the long-fibrous bodies 7, a framework material, for example, a mesh body having a conical or pyramidal side wall, a circular or polygonal annular material, or a helical framework material is inserted. Specifically, the method is not restricted. Specifically, any method can be applied to the filter device in the operation mode, as long as the opening portion 30 can be provided in the aggregate of bundled long-fibrous bodies, and the matters to be filtered can pass the filter material without being obstructed.

Here, as a mode of the filter having a small pressure loss and a high filtering capacity, by using fibers with a relatively large diameter of about 100 μm as the long-fibrous bodies 7, the vacancy in the long-fibrous bodies in the filtering portion is relatively enlarged. The thickness of a laminated layer of long-fibrous bodies is increased. Also, by using extra fine fibers with a diameter of 70 μm or less, the cross section of the opening is formed like a polygonal star, thereby enlarging the surface area of the filtering portion.

The diameter of the long-fibrous body is preferably 0.1 to 150 μm, more preferably 0.1 to 100 μm, especially preferably 1.0 to 30 μm. If the diameter is less than 0.1 μm, preparation is difficult, and handling is also difficult. On the other hand, if the diameter exceeds 150 μm, fiber preparation is difficult, and the collecting efficiency is probably dropped for the filter.

The length and number of the long-fibrous bodies are not especially restricted, and can be appropriately selected according to the purpose. Also, the lengths of all the long-fibrous bodies can be the same or can be changed as required.

Figure 5:
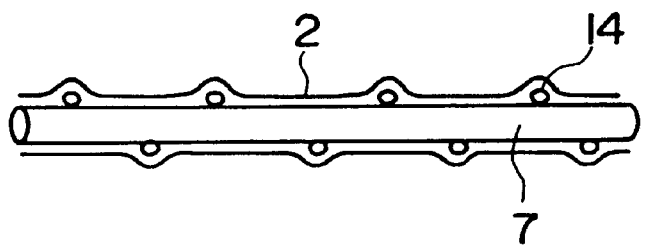
FIG. 5 is a view illustrating protrusions formed on a surface of a photocatalyst fibrous body.
Figure 6:
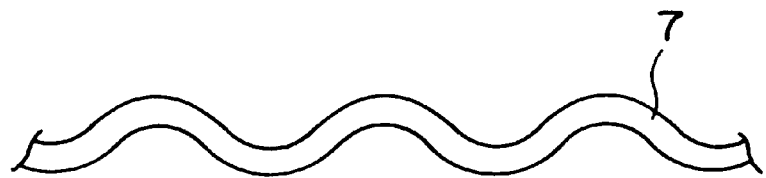
FIG. 6 is a view illustrating a photocatalyst fibrous body formed in a wave form.
Figure 7:
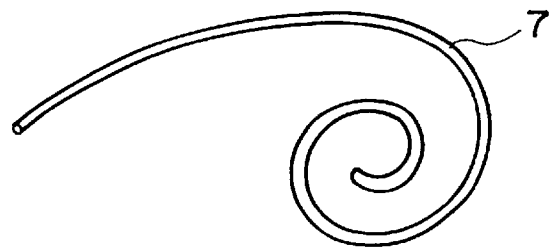
FIG. 7 is a view illustrating a photocatalyst fibrous body formed in a curved form having a curvature gradually increased toward a tip.

The long-fibrous body 7, formed in a wave form in a longitudinal direction as shown in FIG. 6, is advantageous when irradiating light from the light guiding body directly to the photocatalyst. Also, a fibrous structural body as shown in FIG. 5 with the photocatalyst 2 carried on protrusions 14 formed on a surface of the light guiding body 1 is further preferable as the filter. Further, when, as shown in FIG. 7, the body is constituted in a curved configuration having a curvature radius decreased toward its tip, the quantity of light leakage can be uniform in a longitudinal direction, thereby providing a uniform photocatalyst action.

By using the photocatalyst fibrous bodies, a filter material having an adequate vacancy can be obtained simply by bundling or laminating the photocatalyst fibrous bodies. Additionally, even when fluid is passed, the vacancy is unchanged, and an adequate vacancy can be maintained over a long time period. Also, the filter material can be used without undergoing a spinning process. Even the photocatalyst fibrous body with which it is heretofore difficult to constitute the filter material can be used. Further, since the surface area of the filtering portion is enlarged, the purifying efficiency can be enhanced when fluid is purified by using the surface reaction.

The vacancy can be optionally changed with the size or pitch of the wave form or the protrusions, the interval of lamination of the long-fibrous bodies and the like.

The pitch of the protrusions formed on the long-fibrous body is not especially restricted, but is around 2 to 20 times the fiber diameter, preferably 3 to 10 times. If the pitch is twice or less the fiber diameter, the resistance loss is enlarged because of reduction of the passage. On the other hand, if the pitch exceeds 20 times the fiber diameter, it is difficult to keep the interval between fibers, and the filtering effect is probably reduced. The diameter of the protrusion is preferably selected as around 0.3 to 100 μm.

The protrusion can be formed in, for example, a sphere, rod, scale, fiber, porous or another configuration. The sizes of all the protrusions can be the same, but in view of the collecting efficiency, the size on an incident face is enlarged and reduced toward an emitting face. Then, the collecting density is dispersed, and the collecting efficiency and the filter life can be increased. The distribution density of the protrusions is not especially restricted, and can be appropriately designed as required by considering the vacancy, the pressure loss, the pressure or quantity of fluid, the strength, diameter and thickness of the filter material, the desired collecting efficiency and the like. As the material of the protrusion, for example, ceramic, glass, ceramic glass, metal, resin, crystal and the like are available. The material of the filter material can be the same as or different from the material of the protrusions formed on the surface of the filter material.

Further, when the light guiding body is used as the long-fibrous body 7, as shown in FIG. 7, the body is formed in a curved configuration with its curvature radius reduced (with its curvature enlarged) gradually. Then, the quantity of light leakage can be lost the same between the portion having a large quantity of light at the proximal end of the long-fibrous body and the portion having a small quantity of light at the tip. Light can be efficiently supplied to the photocatalyst.

The filter of the invention can use the photocatalyst reaction, when the photocatalyst is carried by the long-fibrous body.

The material of the long-fibrous body carrying the photocatalyst and the material of the photocatalyst are the same as described regarding the second operation mode.

In the filter device in which light is injected to the end of the filter material, the long-fibrous body consisting of the light guiding body is the support body of the photocatalyst, and also serves as a wave guiding passage for passing the light for raising the photocatalyst reaction. For this, the bend angle θ of the long-fibrous body needs to be set to such a degree that the function of the wave guiding passage is not lost. Specifically, the angle is preferably 15° or less.

In the filter device in which light is injected to the end of the filter material, even if the filter material is covered with dirt, dust, sludge or the like, light can irradiate the photocatalyst. Therefore, the catalyst function is not deteriorated. Also, since light reaches the photocatalyst via the light guiding body, as compared with when irradiated from the outside, most of the light energy from the luminous source can be effectively irradiated to the photocatalyst. An intense ultraviolet ray is unnecessary, or a large-scaled luminous source is unnecessary.

In this case, as a preferable structure, when light is injected to the end of the filter material in a converging direction, the incident light at the converging portion of the filter material hardly leaks outside the long-fibrous body. Conversely, the incident light at the filtering portion can easily leak outside the long-fibrous body. In this structure, even if the luminous source cannot be placed in the vicinity of the filtering portion, the filter of the operation mode can be used. Additionally, all the incident light can irradiate the photocatalyst.

For this, a part of the long-fibrous body carrying the converging portion of the filter material is constituted of an optical fiber, and the other part of the long-fibrous body corresponding to the filtering portion of the filter material is preferably constituted of a material via which light leaks before supplied to the photocatalyst, instead of using a material carrying a clad of the optical fiber.

As the clad material which can be used here, for example, a silica glass or another low-refractive glass, an organic resin or the like is available. Also in the filtering portion, no clad is provided, but the core is preferably exposed. Especially, the photocatalyst having a higher refractive index than the core is more preferably carried on a surface of the core exposed portion.

As aforementioned, the filter device in the operation mode can be used in an exhaust gas purifying device for removing solid granulated matters (particulates) consisting of black smoke, unburnt hydrocarbon and lubricating oil included in exhaust gas from a diesel engine, an air filter for a clean room, a gas treatment filter for an air cleaner or the like, a water or sea water purifying filter or another solution treatment filter or other various applications.

In the following, the third operation mode can be further detailed based on an embodiment.

Figure 15:
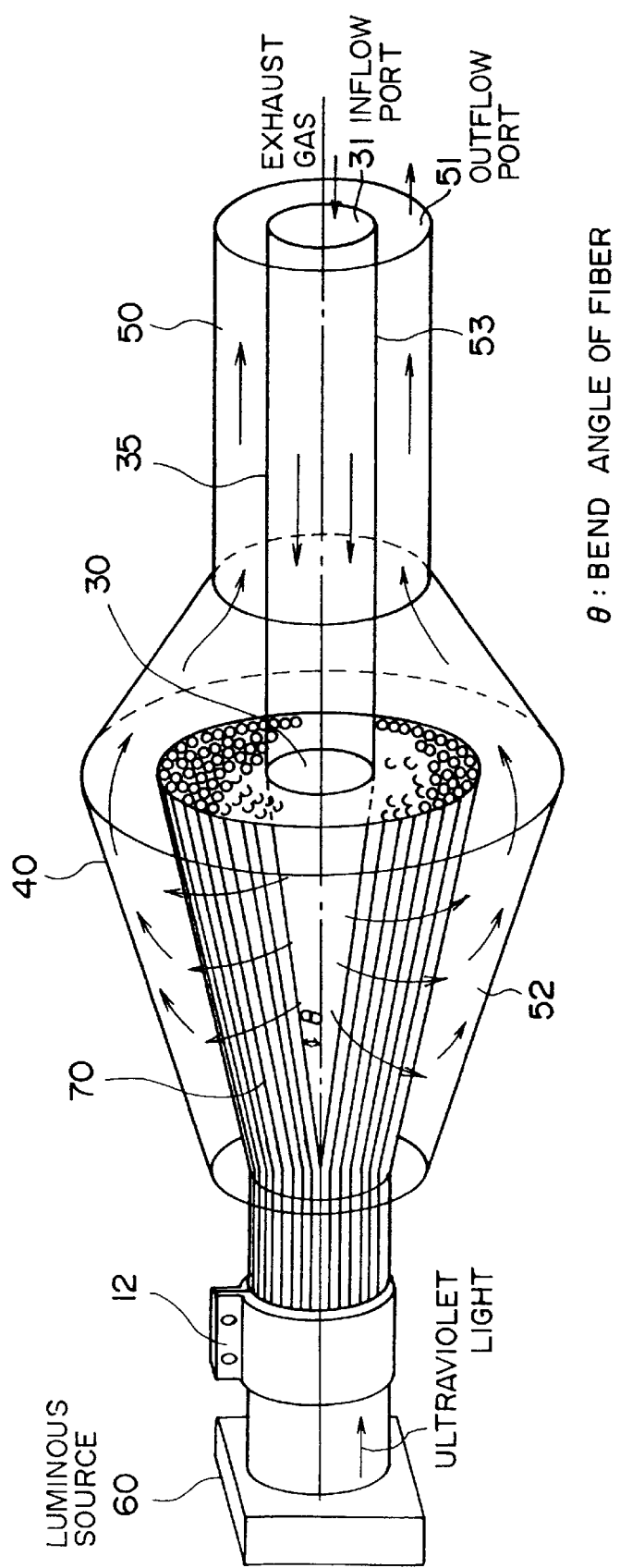
FIG. 15 is a diagrammatic perspective view of a DPF according to an embodiment of the invention.

FIG. 15 is a view showing an example in which the filter device in the operation mode is applied to a diesel particulate filter (DPF).

In a long-fibrous body with a diameter of 30 μm and a length of 600 mm, protrusions with a diameter of 30 μm were formed at a pitch of about 100 μm on a portion forming a filtering portion, a 0.1 μm thick film of $TiO_2$ was held on a surface, and a clad of silica glass was formed in a surface of a portion forming a converging portion. A filter was formed by bundling 8000×338 pieces of the long-fibrous bodies, fixing one end of the bundle with the holder 12, and inserting from the other end a mesh of stainless steel having a conical side wall (with an apex angle of about 90°) into almost the central portion of the bundle of long-fibrous bodies to form an opening. Here, as the material of the long-fibrous body, an alumino-silicate glass (with a glass transition point of 100 to 700° C.) which can resist a high temperature (100 to 700° C.) was used. Alternatively, a quartz glass (with a glass transition point of 1100° C.) or the like can be used.

By covering the filter with an outer shell material 40 of stainless steel, and disposing, at the side of an opening in the filter material, an outflow cylinder 50 continuous to the outer shell material 40 and an inflow cylinder 35 connected to the opening 30 in the filter material at a position to be inserted into the outflow cylinder 50, an inflow port 31 of exhaust gas and an outflow port 51 were secured. Further by installing a luminous source 60 for irradiating an ultraviolet ray at an end of the converging portion, a DPF was constituted.

In the DPF of the embodiment, as shown by arrows in FIG. 15, the exhaust gas passing from the inflow port 31 via the inlet cylinder 35 into the opening 30 in the filter material reaches the inner wall of the filtering portion. Around the reached point, the exhaust gas passes through the filter in a direction intersecting the long-fibrous bodies constituting a filter material 70, while particulates are removed through the long-fibrous bodies. Subsequently, the exhaust gas having passed the filter is discharged through a clearance passage 52 between the filter and the outer shell material to the outside of the outflow port 51. In this case, in the embodiment the clearance portion of the filter is narrowed toward its depth. Therefore, the pressure drop of the flowing exhaust gas is compensated, the exhaust gas is uniformly filtered by the filter, and particulates are efficiently collected without deviation in collecting.

In the DPF of the embodiment, the exhaust gas having passed the filter passes the filter completely before reaching the converging portion, and is discharged via the clearance passage 52 between the filter and the outer shell material 40. The space inside the outer shell material 40 is closed except the inflow and outflow ports. Therefore, the direction of gas flow is changed toward the outflow port 51, and the gas is immediately exhausted from the outflow port 51.

In this manner, in the DPF of the embodiment, since the passage of exhaust gas is completely separated from the luminous source, there is no difficulty in design. The DPF is practically useful.

Then, in the DPF of the embodiment, by injecting light from the end of the converging portion of the filter material 70 to the long-fibrous body, the light leaking from the elongate fibrous body of the filtering portion optically decompose particulates sticking to the long-fibrous body by means of the photocatalyst action.

In the filter in the operation mode, only by irradiating light to the cross sections of the long-fibrous bodies in the converging portion, light can be easily introduced into all the long-fibrous bodies. Since the lengths of the long-fibrous bodies can be almost the same, differences are hardly made in photolysis capacity in a cross-sectional direction. Also, the bend angle θ of each long-fibrous body is small, additionally, a difference in bend angle among the respective long fibers is small, therefore, there is only a small difference in the quantity of leakage of introduced light among the long-fibrous bodies. A uniform and efficient photolysis action can be produced.

As aforementioned, the constitution of the DPF according to the embodiment has a simple and inexpensive mechanism, while realizing a long durable filter free of maintenance.

According to the embodiment, the area of the filtering portion can be enlarged, and a filter having a good collecting efficiency can be obtained.

Also, in the filter material, when the clearance portion is gradually narrowed from the opening, the pressure drop in the entering fluid is compensated to some degree. A difference in pressure among respective positions on the inner peripheral face of the filter is reduced. Therefore, deviation in collecting can be advantageously alleviated.

Further as the long-fibrous body, by using a long-fibrous body formed in a wave form in a longitudinal direction or a long-fibrous body with protrusions formed on a surface, a filter material having an adequate vacancy can be formed just by bundling or laminating the long-fibrous body. Additionally, even when fluid is passed, the vacancy remains unchanged. In the filter, an appropriate vacancy can be maintained over a long time period. Further, since the surface area of the filtering portion is enlarged, the purifying efficiency can be enhanced when fluid is purified using a surface reaction.

Also, when the filter of the operation mode is used as a filter using a photolysis action, light can be introduced into all the long-fibrous bodies. Light can sufficiently and uniformly reach the photocatalyst. As a result, a long-durable filter device free of maintenance can be provided.

Further, by providing the heating means in the filter device of the operation mode, the effect of the second operation mode can also be provided.

A fourth operation mode of the invention is now described. In the operation mode, the invention is applied to a diesel particulate filter (DPF). The operation mode of the filter device is detailed referring to the drawings.

The most characteristic part of the operation mode lies in that the DPF is constituted of one type or two or more types of extra fine glass fiber with a diameter between 1 micron and 70 microns.

In view of a filter theory, the diameter of the extra fine glass fiber for collecting diesel particulates is preferably between 1 micron and 70 microns. Further, the diameter of the extra fine glass fiber is preferably 5 to 50 microns, more preferably between 5 microns and 30 microns. To form the extra fine glass fiber having such diameter, a known technique for manufacturing an optical fiber can be used. An extra fine glass fiber with a predetermined diameter and length can be easily obtained. By using the extra fine glass fiber with a diameter between 1 micron and 50 microns, the device can be reduced, and the surface area is enlarged, thereby enhancing a purifying capacity.

Also in the operation mode, to obtain a high thermal durability, an extra fine glass fiber having a glass transition point of 700° C. or more is preferably used. For the extra fine glass fiber, an alumino-silicate glass, a borosilicate glass, a silica glass or the like can be used.

FIGS. 16–22 show constitutions of various DPFs according to the operation mode.

Figure 16:
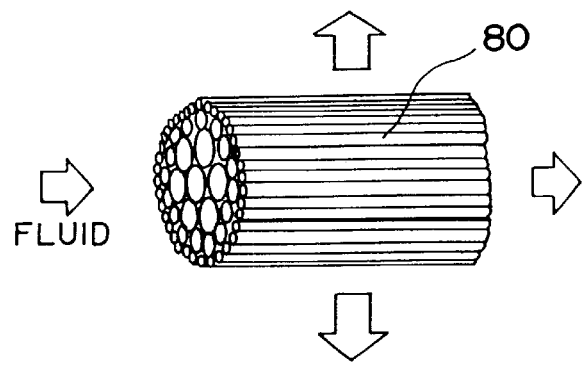
FIG. 16 is an explanatory view of one filter constituting a DPF according to a mode of operation, which is a structural body of glass fiber woven in a bundle.

FIG. 16 shows glass fibers 80 woven in a bundle. In this example, by using glass fibers having different diameters, large-diameter fibers are disposed in a central portion and small-diameter fibers are disposed toward an outer periphery. However, all the fibers can have the same diameter. Alternatively, diameters can be gradually increased from the central portion toward the outer periphery.

Figure 17:
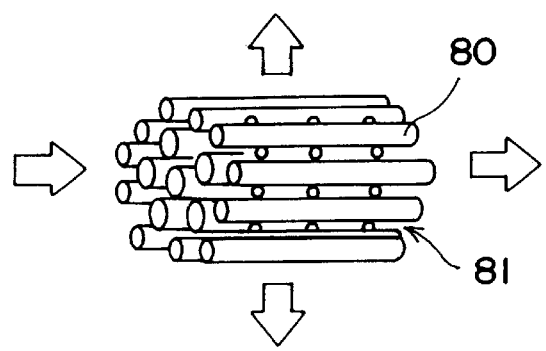
FIG. 17 is an explanatory view of one filter constituting a DPF according to a mode of operation, which is a structural body of glass fiber woven in a bundle with spacers formed therein.

FIG. 17 shows the glass fibers 80 woven in a bundle with spacers 81 formed therein. In the same manner as in FIG. 16, the diameters of the glass fibers 80 have various constitutional patterns.

Figure 18:
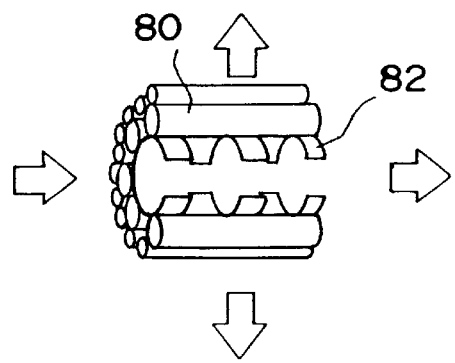
FIG. 18 is an explanatory view of one filter constituting a DPF according to a mode of operation, which is a structural body having a support portion formed of glass, metal, ceramic or crystal with a central portion hollowed and a periphery of glass fiber woven in a bundle.
Figure 19:
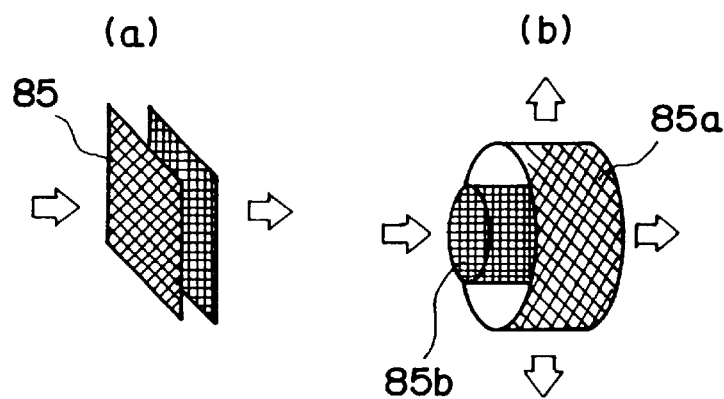
FIG. 19 is an explanatory view of one filter constituting a DPF according to a mode of operation, which is a structural body of glass fiber woven in a mesh structure: (a) is a view of a filter structured in layers relative to a passage, and (b) is a view of a filter structured in wound or roll form.
Figure 20:
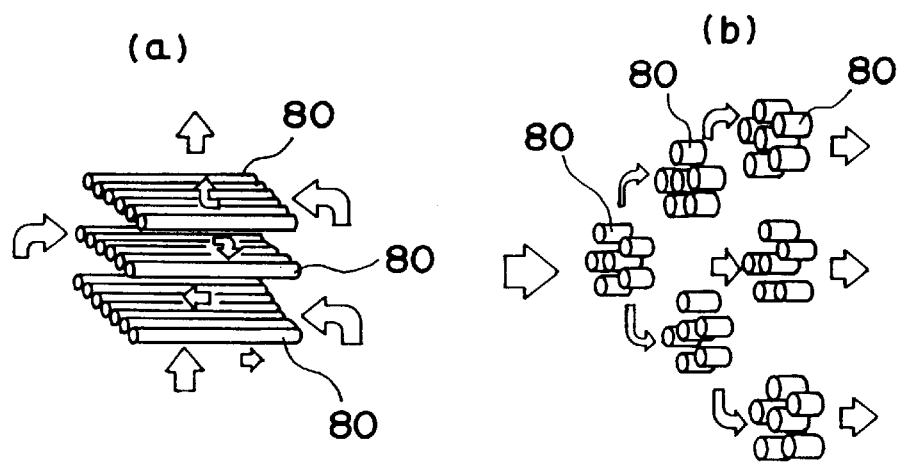
FIG. 20 is an explanatory view of one filter constituting a DPF according to a mode of operation, which is a structural body of glass fiber structured in layers relative to a passage: (a) is a view of the fibers in the form of layers, and (b) is a view of the fibers in the form of bundles.

In FIG. 18, to make a hollow in a central portion, a support portion 82 is formed of glass, metal, ceramic or crystal. Around the central portion, the glass fibers 80 are woven in a bundle. In the same manner as in FIGS. 16 and 17, the diameters of the glass fibers 80 have various constitutional patterns.

In FIGS. 19(a) and (b), glass fibers 85, 85a and 85b woven in meshes are structured. In the same manner as in FIGS. 16 and 17, the diameters of the glass fibers have various constitutional patterns. Also, even when the glass fibers are woven in cloths, the same constitutions can be formed as the meshes.

In FIGS. 20(a) and (b), the glass fibers 80 form layers relative to passages as structures of filters.

Figure 21:
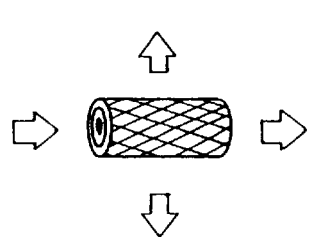
FIG. 21 is an explanatory view of one filter constituting a DPF according to a mode of operation, which is a structural body of glass fiber wound up in a candle form.

FIG. 21 shows a structure in which glass fibers are wound up to form a candle. Also in the structure, fiber diameters can be changed.

Figure 22:
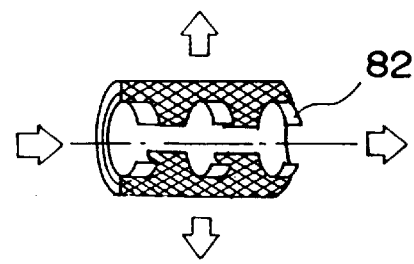
FIG. 22 is an explanatory view of one filter constituting a DPF according to a mode of operation, which is a structural body having a support portion formed of glass, metal, ceramic or crystal with a central portion of a candle hollowed and a periphery of glass fiber wound up.

In FIG. 22, to make a hollow in a central portion of the candle structure, the support 82 is formed of glass, metal, ceramic or crystal. The fibers are wound up around the periphery of the central portion. Also in the structure, fiber diameters can be changed.

Also, partially or entirely on the surface of the extra glass fiber, a photocatalyst is effectively formed. In this case, by introducing light from one end of the extra fine glass fiber into the extra fine glass fiber, light is supplied to the photocatalyst formed on the surface of the extra fine glass fiber, raising a photocatalyst action. Matters sticking to the extra fine glass fiber can be decomposed/removed.

Further, a heating means for heating the photocatalyst and the captured matters of DPF (black smoke, unburnt hydrocarbon, lubricating oil and the like) is effectively provided. Thereby, soot can be efficiently burnt. Further, by heating the photocatalyst, the reaction rate of the photolysis reaction by means of the photocatalyst can be increased.

The aforementioned operation mode relates to the DPF. The invention can be applied to, for example, an air filter for a clean room or another filter for an air cleaner or the like in the same manner.

A filter material used in a filter device according to a fifth operation mode of the invention is now described.

The filter material of the invention is characterized in that protrusions are formed on a surface of a filter base material.

Here, the configuration, material and the like of the filter base material are not especially restricted. Various known filter base materials can be used.

As the configuration of the filter base material, for example, a fiber, a plate, a rod, a bead, a cloth, particulates (including a porous body) or another known configuration is available. However, a fiber configuration or a plate configuration is preferable, when considering that an inexpensive filter can be obtained just by bundling or laminating the filter material.

As the material of the filter material, for example, ceramic, glass, glass ceramic, metal, metal mesh, resin, plastic, crystal and the like are suitable.

The configuration and material of the protrusions formed on the surface of the filter base material are not especially restricted. Various materials and configurations can be used.

The protrusion can be formed in, for example, a sphere, rod, scale, fiber, porous or another configuration.

As the material of the protrusion, for example, ceramic, glass, glass ceramic, metal, resin, crystal (e.g. alumina, zirconia, titania, mullite, cordierite, magnesia, barium titanate and the like), particles (e.g. vitreous, crystalline and other particles) are available. The glass base material can be the same as or different from the material of the protrusion formed on the surface of the glass base material.

A method of forming protrusions is not especially restricted.

The distribution density of the protrusions is not especially restricted, and can be appropriately designed as required by considering the vacancy (mesh), the pressure loss, the pressure and quantity of fluid, the strength of the base material, the diameter and thickness, the collecting efficiency and the like.

A method of manufacturing the filter material of the invention is now described.

The method of manufacturing the filter material of the invention is characterized in that protrusions are formed on the surface of the filter base material.

As the technique for forming protrusions on the surface, various techniques in various fields are known. These techniques can be used.

Modes of a method for forming protrusions are illustrated in the following.

A first mode is a method for forming protrusions by fixing particles on a surface of a photocatalyst fibrous body base material. Following various modes are included. Here, the photocatalyst fibrous body base material is the base material carrying no photocatalyst. Particles are fixed on the surface of the photocatalyst fibrous body base material carrying no photocatalyst to form protrusions and the photocatalyst is formed on the protrusions. This method is used because it is advantageous in respect of the surface area of the photocatalyst, the strength of the protrusions and the like.

(1) A method of applying to the surface of the photocatalyst fibrous body base material an application liquid formed by mixing, dispersing or suspending particles in a binder component.
(2) A method of applying to the surface of the photocatalyst fibrous body base material a binder component and fixing particles before the binder component is solidified.
(3) A method of thermally fusing the photocatalyst fibrous body base material and particles. In the method, both can be heated concurrently, particles can be dispersed on the surface of the heated photocatalyst fibrous body base material, or heated particles or molten particles can be dispersed on the surface of the photocatalyst fibrous body base material.
(4) A method of dispersing or spraying to the surface of the photocatalyst fibrous body base material a liquid for forming particles after solidifying, to solidify.
(5) A method of changing the quality of the surface of the photocatalyst fibrous body base material with a reagent or the like, fixing particles to the surface and solidifying. Specifically, for example, after a surface of an acrylic or another organic resin is melted with an organic solvent, particles are fixed to the surface to solidify.

The particles used in the aforementioned modes (1)–(5), for example, vitreous or crystalline particles can be used. As the vitreous particles, a silica glass, a soda lime silicate glass and a non-alkaline glass are available. There are numerous crystalline particles, but typical are alumina, zirconia, titania, mullite, cordierite, magnesia, barium titanate and the like.

A second mode is a method of forming protrusions on the surface itself of the photocatalyst fibrous body base material. Following various modes are included.

(1) A method of shaping protrusions on the surface of the photocatalyst fibrous body base material by using a metallic mold.
(2) A method of forming protrusions by transferring a configuration of a metallic mold to the surface of the photocatalyst fibrous body base material.
(3) A method of forming protrusions by etching the surface of the photocatalyst fibrous body base material. In the method, by using a known lithography technique, protrusions can be formed in a regular, optional arrangement and distribution density of the order of submicrons. A hyper sophisticated filter can be prepared.

A third mode is a method of forming protrusions on the surface of the photocatalyst fibrous body base material by mixing particles with a raw material of the photocatalyst fibrous body base material and shaping.

A filter device according to the invention is now described.

The filter device of the invention is characterized in that the filter material with protrusions formed on the surface thereof is used.

Since the filter material with protrusions formed on the surface is aforementioned, further description is omitted. hen a filter is constituted by using the filter material, a known mode for constituting the filter can be used in accordance with the material, configuration and the like of the filter.

Further, when a filter is constituted by using the fiber with protrusions formed on its surface as the filter material, just by bundling and fixing a plurality of fibers almost in the same direction, a filter having a required clearance (mesh) can be formed. The coarseness of mesh can be optionally changed with protrusion size, interval, distribution density and the like.

Figure 23:
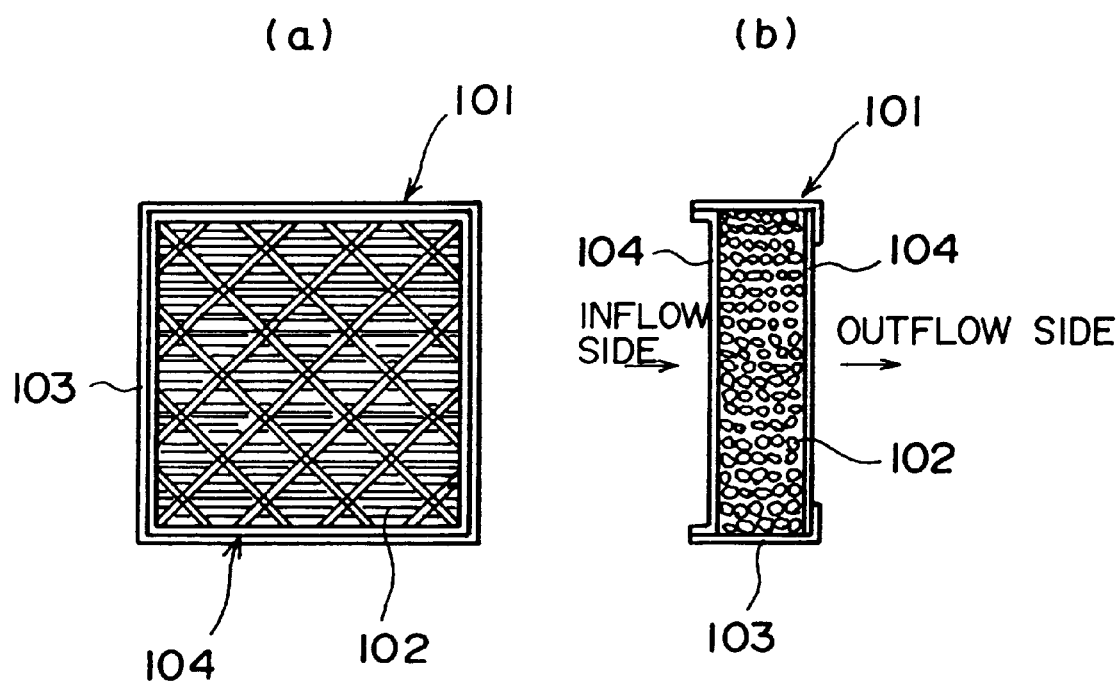
FIG. 23 is a view showing a filter device according to an embodiment of the invention: (a) is a front view and (b) is a longitudinal sectional view of (a).

FIGS. 23(a) and (b) show specific examples.

A filter device shown in the figures is constituted of a housing 101 and a filter of bundled fibers 102.

The housing 101 is constituted of an outer frame 103 and ventilation members 104 having a coarse mesh structure constituting ventilation faces at inlet and outlet sides. Inside the housing 101, fibers 102 are arranged uniformly and almost parallel and fixed by pressing both sides with the ventilation members 104.

The fibers 102 are long-fibrous fibers with protrusions having required dimensions intermittently formed on the surfaces thereof. The coarseness of the mesh can be optionally changed with the sizes of the protrusions on the fibers. For example, when the filter material of fibers with a diameter of 5 $\mu$m with protrusions with a particle size of 1 $\mu$m formed thereon is used, particles of the order of submicrons can be captured.

Further, when all the particles on the surface of the fibers are of the same size, the collecting efficiency at the inlet side is increased, and the collecting efficiency is not superior. However, by increasing the size of the protrusions at the inlet side and reducing the size toward the outlet side, the collecting density is dispersed, thereby, increasing the collecting efficiency and the filter life.

When a substrate with protrusions formed on its surface is used as the filter material to form a filter, simply by laminating and fixing a plurality of substrates, a filter having a required clearance (mesh) can be formed. Also in this case, the coarseness of the mesh can be optionally changed with the sizes, intervals and distribution density of the protrusions, the intervals of the substrates and the like.

On the surface of the filter material constituting the filter device of the invention, a catalyst (including a surface reaction promoting substance) can be carried.

In this case, according to the invention, since protrusions are formed on the surface of the filter material, as compared with the filter material having no protrusions, the surface area is enlarged, and the efficiency of the filter having a function of purifying fluid using a surface reaction can be enhanced.

Here, the catalyst (including the surface reaction promoting substance) is not especially restricted, and any substance having a fluid purifying function can be used.

In the invention, the filter material is used as a light guiding body for guiding the light with a wavelength needed to activate a photocatalyst. The photocatalyst is carried on the surface of the filter material. The light guided by the light guiding body is emitted from the surface of the light guiding body, and reaches the photocatalyst. Such photocatalyst filter device can be constituted.

In this case, the protrusions on the surface of the filter material can be formed of particles having a photocatalyst action. Further, the entire surface of the filter material including the protrusions can be covered with a film having a photocatalyst action. Also, the entire surface of the filter material provided with the protrusions formed of transparent particles, opaque particles or photocatalyst particles can be covered with a film having a photocatalyst action.

As the light guiding body material, for example, glass, ceramic, plastic, crystal and the like are available. One of these materials can be singly used, or two or more materials can be mixed or compounded (e.g. bonded or the like).

As the configuration of the light guiding body, for example, a fiber, a honeycomb, a mesh, a cloth, a layer, a cotton and the like are available. One of these configurations can be singly used, or two or more configurations can be compounded (e.g. bonded or the like).

As the photocatalyst, for example, titanium oxide or its compound, iron oxide, zinc oxide or its compound, ruthenium oxide, cerium oxide or its compround, tungsten oxide, molybdenum oxide or its compound, cadmium oxide compounds which generate any of said oxides are suitable, oxide. One of these photocatalysts can be singly used, or two or more photocatalysts can be mixed or combined (e.g. coexist or the like).

As a carrying method of the photocatalyst, for example, a sol-gel method, a peraerosol method, a wash/coat method, an evaporation method, a sputtering method, a thermal decomposition method, a metal oxidizing method and the like are available. The film thickness is, for example, around between 1 nm and 1 mm.

To the photocatalyst, a substance for reinforcing a photocatalyst active layer, reinforcing an adherence strength, reinforcing a stability, reinforcing a photo-reaction, reinforcing an adsorption or providing another action can be added as an additive, or provided as an undercoat layer of a catalyst layer. As the substance, for example, Cr, Ag, Cu, Au, Pt, Ru, Pd, Rh, Sn, Si, In, Pb, As, Sb, P or another metal, its oxide, its compound and the like are available.

For the light to irradiate the photocatalyst, its wavelength, intensity and the like can be appropriately selected in accordance with the type of the photocatalyst. For example, when the photocatalyst is $TiO_2$, an ultraviolet ray of 200 nm to 500 nm which can activate the photocatalyst is preferable. As a luminous source, a mercury lamp, a mercury-xenon lamp or the like can be used.

Further, the photocatalyst and the light guiding body material may be selected by considering the refractive index. Because, different from an optical fiber enclosing light in its core, light needs to be leak from the side of the photocatalyst as a covering material, a photocatalyst having a larger refractive index as cored with the light guiding body material may be selected.

Also, by using an optical fiber provided with a clad on the outer periphery of a core, a core exposed portion lacking the clad is formed, and the photocatalyst having a higher refractive index than the core is carried on the core exposed portion.

The aforementioned photocatalyst filter device can be preferably used as a diesel particulate filter (DPF) for removing solid granulated matters (particulates) consisting of black smoke, unburnt hydrocarbon and lubricating oil included in exhaust gas from a diesel engine, a gas treatment filter (e.g. an air filter for a clean room, an air cleaner), a liquid treatment filter (e.g. a water or sea water purifying filter) or the like.

In the following, the invention is further detailed based on embodiments.

EXAMPLE 1

A silica glass filler with an average particle diameter of 5 μm was suspended in a sol solution prepared by hydrolysis of silicon tetra-ethoxide, to prepare a coat liquid.

After the coat liquid was applied to a glass fiber with a diameter of 125 μm in a dipping method, thermal treatment was conducted at 450° C. for one hour.

On the surface of the obtained fiber, a large number of particles adhered. The fiber having an irregular surface could be obtained. Further, even when the fiber was strongly rubbed, the particles sticking to the surface were not detached.

EXAMPLE 2

Mullite particles with an average particle diameter of 2 μm were suspended in a sol solution prepared by hydrolysis of titanium tetra-butoxide, to prepare a coat liquid.

After the coat liquid was applied to a stainless steel fiber with a diameter of 250 μm in a dipping method, thermal treatment was conducted at 400° C. for one hour.

On the surface of the obtained fiber, a large number of particles adhered. The fiber having an irregular surface could be obtained. Further, even when the fiber was strongly rubbed, the particles sticking to the surface were not detached.

EXAMPLE 3

An ultraviolet hardening resin was printed on a surface of a plate alumina substrate by screen printing. Onto a portion to which the ultraviolet hardening resin was printed, beads of soda lime glass with an average particle diameter of 0.1 mm were dispersed, then an ultraviolet ray was irradiated, to harden the resin.

On the surface of the obtained alumina substrate, a large number of particles adhered. The substrate having an irregular surface could be obtained. Further, even when the substrate was strongly rubbed, the particles sticking to the substrate surface were not detached.

EXAMPLE 4

To a surface of a plate polyethylene substrate, heated stainless particles with an average particle diameter of 0.1 mm were dispersed.

The heated particles melted the surface of the substrate to stick thereto. Even when the substrate surface was strongly rubbed, the particles sticking to the surface of the substrate were not detached.

EXAMPLE 5

After a thermally hardening epoxy resin was sprayed to a surface of a plate alumina substrate, the substrate was heated to harden the epoxy resin.

On the surface of the obtained alumina substrate, a large number of epoxy resin protrusions with a diameter of 0.2 mm were observed. Even when the substrate surface was strongly rubbed, the protrusions were not detached.

EXAMPLE 6

A surface of an acrylic substrate was melted by spraying acetone thereto. After beads of soda lime glass with an average particle diameter of 50 μm were dispersed to the surface, the substrate was dried.

On the surface of the obtained substrate, a large number of glass beads adhered. The substrate having protrusions could be obtained. Further, even when the substrate surface was strongly rubbed, the protrusions were not detached.

EXAMPLE 7

To a metallic mold with hemispherical recesses with a diameter of 0.5 mm and a depth of 0.25 mm arranged longitudinally and transversely at intervals of 2 mm, a thermally hardening epoxy resin was poured, heated and hardened.

As a result, the substrate having a large number of protrusions on its surface could be obtained.

EXAMPLE 8

Silica glass beads with an average particle diameter of 7.5 μm were suspended in a hydrolysis liquid prepared by hydrolysis of silicon tetra-ethoxide under the condition there was a little water. Obtained sol liquid was heated to promote a polycondensation reaction, so that the sol liquid had viscosity sufficient for spinning. After fiber was spun from the sol liquid, heating was performed at 800° C. for one hour.

On the obtained fiber surface, a large number of protrusions based on the silica glass beads were formed. The fiber had an average diameter of 100 μm.

EXAMPLE 9

Figure 24:
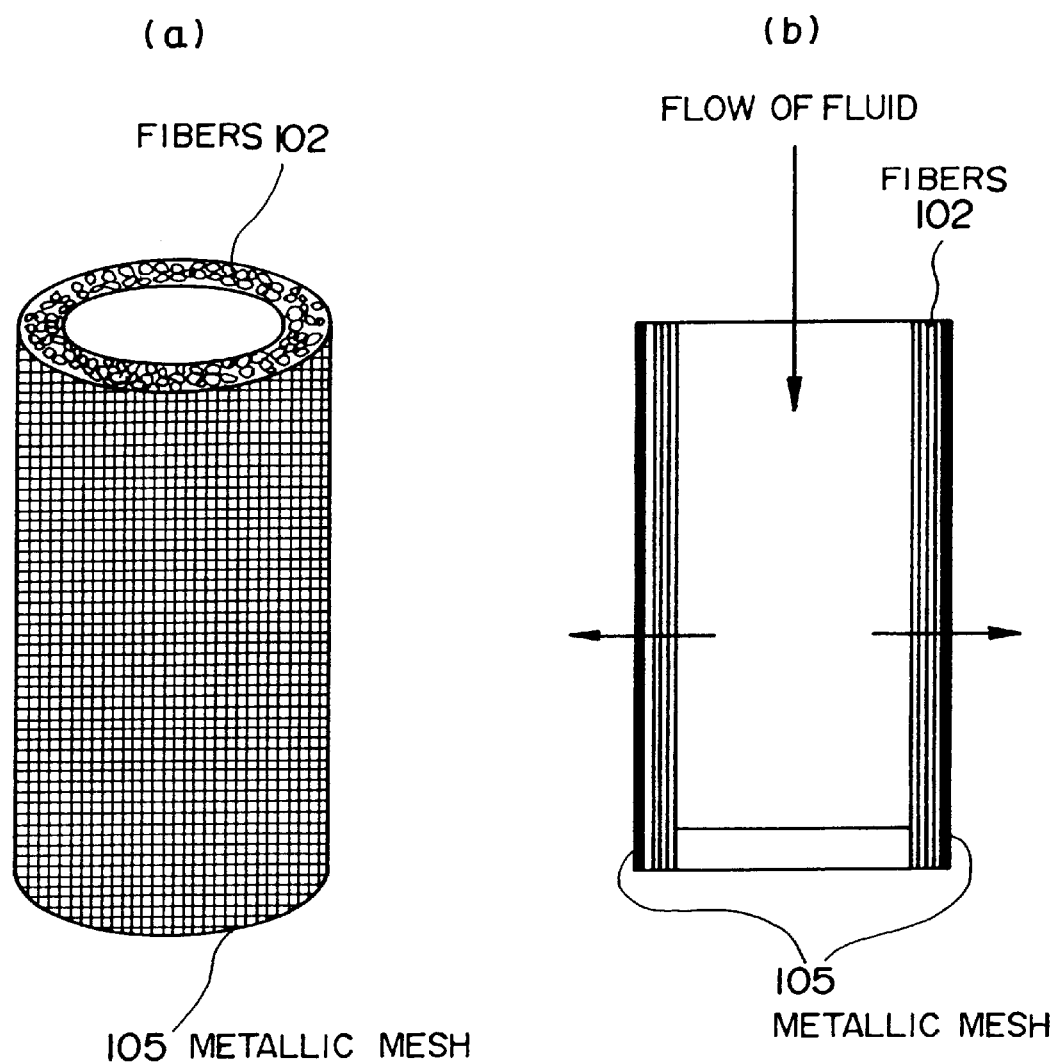
FIG. 24 is a view showing a filter device according to another embodiment of the invention: (a) is a perspective view and (b) is a longitudinal sectional view of (a).

Using the fiber prepared in Example 1, as shown in FIGS. 24(a) and (b), fibers 102 were bundled parallel and both ends of a bundle were fixed with metallic meshes 105, thereby preparing a filter.

As compared with a small-fiber filter having the equivalent vacancy, the obtained filter had a higher collecting efficiency, and its performance could be maintained over a longer time period.

EXAMPLE 10

Figure 25:
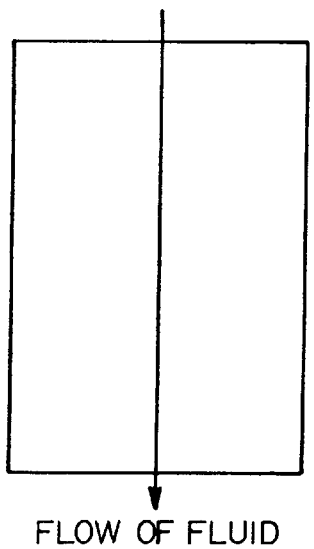
FIG. 25 is a view showing a filter device according to an embodiment of the invention: (a) is a front view; (b) is a traverse sectional view of (a); and (c) is a plan view of a substrate.
Figure 25:
Figure 25:
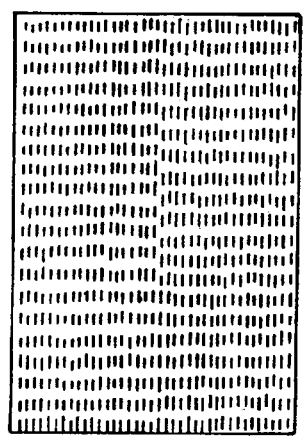

Using the substrate prepared in Example 3, as shown in FIGS. 25(a)–(c), alumina substrates with protrusions of beads on surfaces thereof (FIG. 25(c)) were laminated parallel (FIG. 25(b)), thereby preparing a filter.

The obtained filter had a small particle diameter able to be captured, a high precision and a high collecting efficiency, and its performance could be maintained over a long time period.

EXAMPLE 11

After the fibers prepared in Example 1 were carried on photocatalysts (TiO$_2$), as shown in FIG. 3(a), the fibers were cut into predetermined lengths, and arranged like a blind. One end of the fibers was held to prepare basic units in such a manner that from the end, light irradiated each fiber. The basic units were intersected at an angle of 90° as shown in FIG. 3(b). Thereby, a blind-lattice diesel particulate filter (DPF) was prepared.

Since the DPF used the fibers with protrusions formed thereon, the catalyst function and the collecting efficiency were higher as compared with a DPF with no protrusions.

The invention has been described above with reference to the preferred embodiments as shown in the figures, but is not restricted to the aforementioned embodiments.

For example, the drawings are depicted conceptual for convenience. The diameter, filling density and the like of the fibers are not restricted to the modes shown in the drawings.

Also, the size and material of the protrusions are not restricted to the embodiments.

Further, even the conventional three types of filter materials described in the prior art with the protrusions thereon can fulfill the effect of the invention based on the protrusions.

Also, the filter material of the invention can be used for a diffusion plate (scattering plate) for a liquid crystal display, a haze glass and the like.

As aforementioned, according to the operation mode of the invention, by changing the size and distribution density of the protrusions, the vacancy (mesh) can be easily and highly accurately controlled. Also, simply by bundling or laminating the filter material with the protrusions formed thereon, a filter can be obtained. Therefore, different from the prior art, a sophisticated filter can be obtained inexpensively.

Also, since the protrusions formed on the filter material surface provides a vacancy, the vacancy remains unchanged even when fluid is passed. The vacancy can be maintained over a long time period. Therefore, a filter function can be maintained over a long time period.

Further, the use of the filter material basically obviates the necessity of a textile process. Therefore, even the fiber with a long fiber diameter which is heretofore difficult to be used as a long-fibrous filter can be used as the filter material.

Also, since protrusions are formed on the filter material surface, as compared with the surface having no protrusions, the surface area is enlarged, and the efficiency of the filter having a function of purifying fluid using a surface reaction can be enhanced.

A photocatalyst carrying glass material according to a sixth operation mode of the invention is now described.

In the invention, in view of deterioration of a photocatalyst activity, the tolerance of an alkali component in the glass material is determined. Further, considering easiness of forming a photocatalyst thin film, chemical durability, heat resistance, a superior light transmittivity, and an inexpensive manufacture, a glass composition is determined.

The photocatalyst carrying glass material of the invention preferably contains 0 to 10% by weight of an alkali component, and 30 to 80% by weight of SiO$_2$. For example, a low-alkali silicate glass, an alumino-silicate glass, a borosilicate glass and a non-alkali glass are preferable compositions.

However, a borate glass and a phosphate glass are inferior in chemical durability against water, and undesirably lowers the carrying force and photocatalyst function of a photocatalyst thin film.

The glass material in the composition range of the invention can melt at 1650° C. or less, manufacture cost is advantageously lower as compared with a quartz glass. Further, the glass material in the composition range of the invention is superior in chemical durability, heat resistance and light transmittivity (transparency), therefore superior as a photocatalyst carrying base material.

Also, as compared with a quartz glass, the glass material can be easily formed in a fiber, and a fibrous photocatalyst carrying base material can be easily manufactured inexpensively.

Further, the glass material of the invention is a light guiding body with the transmittivity to a wavelength for activating a photocatalyst of 75% or more in the thickness of 10 mm, and is superior as a photocatalyst carrying glass material.

Therefore, the glass material is suitable as the light guiding body for carrying the photocatalyst in the first to fifth operation modes.

For other components in the aforementioned glass material, various known components and positions can be used.

The photocatalyst carrying glass material of the invention preferably contains, in terms of weight %, 30 to 80% of $SiO_2$, 1 to 35% of $Al_2O_3$, 0 to 30% of $B_2O_3$, 0 to 20% of MgO, 0 to 20% of CaO, 0 to 20% of SrO, 0 to 40% of BaO, 0 to 20% of ZnO, 0 to 10% of $Li_2O$, 0 to 10% of $Na_2O$, 0 to 10% of $K_2O$, 0 to 10% of $Cs_2O$, 0 to 10% of the combined content of $Li_2O+Na_2O+K_2O+Cs_2O$ and 0.1 to 65% of the combined content of $MgO+CaO+SrO+BaO+ZnO+Li_2O+Na_2O)+K_2O+Cs_2O$ in view of various properties.

Further, the photocatalyst carrying glass material of the invention more preferably contains, on a basis of weight, 30 to 65% of $SiO_2$, 1 to 20% of $Al_2O_3$, 0 to 20% of $B_2O_3$, 0 to 20% of MgO, 0 to 20% of CaO, 0 to 20% of SrO, 0 to 40% of BaO, 0 to 20% of ZnO, 1 to 60% of the combined content of $MgO+CaO+SrO+BaO+ZnO$, 0 to 10% of $Li_2O$, 0 to 5% of $Na_2O$, 0 to 5% of $K_2O$, 0 to 5% of $Cs_2O$, 0 to 5% of the combined content of $Li_2O+Na_2O+K_2O+Cs_2O$ and 1 to 60% of the combined content $MgO+CaO+SrO+BaO+ZnO+Li_2O+Na_2O+K_2O+Cs_2O$.

Reasons for restricting each component in the aforementioned composition range are as follows.

$SiO_2$, a glass forming component is an indispensable component in the invention. If $SiO_2$ is less than 30% by weight, devitrification resistance and chemical durability are deteriorated. If $SiO_2$ exceeds 80% by weight, glass viscosity becomes high and melting is difficult. Therefore, the content of $SiO_2$ needs to be 30 to 80% by weight. For the same reason, the content of $SiO_2$ is preferably 30 to 70%, more preferably 30 to 65%, most preferably 50 to 60% by weight.

$Al_2O_3$ enhances the chemical durability and heat resistance of glass and lowers a liquidous temperature. However, if $Al_2O_3$ exceeds 35% by weight, devitrification resistance is deteriorated. Therefore, the content of $Al_2O_3$ needs to be 0 to 35% by weight. For the same reason, the content of $Al_2O_3$ is preferably 1 to 20%, more preferably 15 to 20% by weight.

$B_2O_3$ lowers glass viscosity and effectively improves melting property. However, if $B_2O_3$ exceeds 30% by weight, tendency to phase separation is enlarged, and a uniform-quality glass can hardly be obtained. Therefore, the content of $B_2O_3$) needs to be 0 to 30% by weight. For the same reason, the content of $B_2O_3$ is preferably 0 to 15%, more preferably 0 to 10% by weight.

MgO, CaO, SiO, BaO and ZnO, when added in an appropriate quantity, can adjust glass properties and melting property.

Here, MgO lowers the thermal expansion coefficient and viscosity of the obtained glass. If 20% by weight is exceeded, the devitrification resistance of the glass is lowered. Therefore, the content of MOO needs to be 0 to 20% by weight. For the same reason, the content of MgO is preferably 0 to 10%, more preferably 0 to 5% by weight.

Cao provides an action almost similar to that of Mgo. If 20% by weight is exceeded, the devitrification resistance is lowered. Therefore, the content of CaO needs to be 0 to 20% by weight. For the same reason, the content of CaO is preferably 0 to 10%, more preferably 0 to 5% by weight.

SrO enhances the glass devitrification resistance. If 20% by weight is exceeded, however, the devitrification resistance is deteriorated. Therefore, the content of SrO needs to be 0 to 20% by weight. For the same reason, the content of SrO is preferably 0 to 10%, more preferably 0 to 5% by weight.

BaO provides an action almost similar to that of SrO. If 50% by weight is exceeded, however, the devitrification resistance is deteriorated. Therefore, the content of BaO needs to be 0 to 50% by weight. For the same reason, the content of BaO is preferably 0 to 30%, more preferably 0 to 5% by weight.

If the total content of MgO, CaO, SrO, BaO and ZnO exceeds 65% by weight, the devitrification resistance is deteriorated. Therefore, the combined content of $MgO+CaO+SrO+BaO+ZnO$ needs to be 0 to 65% by weight. For the same reason, the total content is preferably 10 to 30%, more preferably 10 to 20% by weight.

The alkali components $Li_2O$, $Na_2O$, $K_2O$ and $Cs_2O$ lower the glass viscosity and improve the melting property. If the total content of these alkali components exceeds 10% by weight, a photocatalyst activity is undesirably deteriorated. Therefore, the combined contents of $Li_2O+Na_2O+K_2O+Cs_2O$ needs to be 0 to 10% by weight. For the same reason, the total content is preferably 0 to 5%, more preferably 0 to 2% by weight.

Further, to the aforementioned glass material of the invention, in addition to the aforementioned components, in a range which does not deteriorate the aforementioned properties, PbO, $ZrO_2$, $TiO_2$, $As_2O_3$, $Sb_3O_3$, $La_2O_3$, $P_2O_5$, $WO_3$, $Bi_2O_3$, $Ta_2O_5$, $Nb_2O_5$, $Gd_2O_3$, F or the like can be added for the purpose of improving devitrification resistance, melting property, chemical durability and the like or as a clarifying agent or the like.

A manufacture method of the glass material of the invention is not especially restricted. For example, a batch raw material is weighed so as to be within the aforementioned range of glass composition, placed in a platinum crucible or another heat resistant container, and heated and melted at 1200 to 1650° C. for about 2 to 4 hours. The molten glass is made uniform by stirring, refining, then poured into a casting mold to be gradually cooled for manufacture.

For the glass raw material used for manufacture of the glass material of the invention, of either component, hydroxide, carbonate, nitrate, sulfide, oxide, nitride or the like which is usually used as the glass raw material can be appropriately used.

The size, configuration and the like of the glass material of the invention are not especially restricted. For example, the glass material of the invention can be used in a flat plate, a fiber, a rod, beads, powder or other various forms.

The photocatalyst carried on the glass material of the invention is not especially restricted. For example, titanium oxide, iron oxide, zinc oxide, ruthenium oxide, cerium oxide, tungsten oxide, molybdenum oxide, cadmium oxide, and strontium oxide, are suitable. One of these photocatalysts can be singly used, or two or more photocatalysts can be mixed or combined (e.g. coexist independently or the like).

As a method of carrying the photocatalyst on the glass material of the invention, for example, a sol-gel method, a peraerosol method, a wash/coat method, an evaporation method, a sputtering method, a thermal decomposition method, a metal oxidizing method and the like are available. The film thickness is, for example, around between 1 nm and 1 mm.

For the light to irradiate the photocatalyst, its wavelength, intensity and the like can be appropriately selected in accordance with the type of the photocatalyst. For example, when the photocatalyst is $TiO_2$, an ultraviolet ray of 200 nm to 500 nm which can activate the photocatalyst is preferable. As a luminous source, a mercury lamp, a mercury-xenon lamp or the like can be used.

To the photocatalyst, a substance for reinforcing a photocatalyst active layer, reinforcing an adherence strength, reinforcing a stability, reinforcing a photo-reaction, reinforcing an adsorption or providing another action can be added as an additive, or used as an undercoat layer of a catalyst layer. As the substance, for example, Cr, Ag, Cu, Au, Pt, Ru, Pd, Rh, Sn, Si, In, Pb, As, Sb, P or another metal, its oxide, its compound and the like are available.

The filter device using the photocatalyst filter constituted of the photocatalyst carried on the glass material of the invention can be preferably used as a diesel particulate filter (DPF) for removing solid granulated matters (particulates) Consisting of black smoke, unburnt hydrocarbon and lubricating oil included in exhaust gas from a diesel engine, a gas treatment filter (e.g. an air filter for a clean room, an air cleaner), a liquid treatment filter (e.g. a water or sea water purifying filter) or the like.

In the invention, protrusions can be formed on a surface of the glass material. Thereby, as ed with the surface having no protrusions, the surface area is enlarged, and the efficiency of the filter having a function of purifying fluid using a surface reaction can be enhanced.

Here, the catalyst (including a surface reaction promoting substance) is not especially restricted. Any substance having a function of purifying fluid can be used.

In the following, embodiments of the invention are described.

EXAMPLES 1–5

Glass materials having compositions shown in the table of FIG. 26 were manufactured.

In either of the examples, hydroxide, carbonate, nitrate, sulfide, oxide, nitride and the like which were usually used as raw materials were used. After each raw material in each example was weighed in such a manner that the composition after melted and gradually cooled was the glass composition shown in Table 1, (not shown) the obtained raw material mixture (batch raw material) was heated and melted at 1200 to 1650° C. for about 2 to 4 hours. The molten glass was defoamed and made uniform in quality by stirring, clarified, poured in a casting mold, then gradually cooled, thereby obtaining a glass mass.

From the glass mass, a plate of 100×100 ×2 mm was cut out, and both faces of the plate were polished, thereby forming a substrate. The substrate glass was coated with $TiO_2$ sol in a dipping method, dried, then burnt at 500° C. for one hour. When the obtained film was measured by X-ray diffraction, it was found that the main component of the film was anatase-type $TiO_2$. The film thickness was 1 $\mu$m.

A commercial salad oil was applied to the substrate glass with the photocatalyst carried thereon. After the substrate glass was let stand under a 1 kW mercury lamp for one hour, weight decrease was measured.

As a result, the photocatalyst on the substrate glass of Examples 1–5 decomposed the salad oil at 0.01 to 0.02 mg/cm iM one hour.

COMPARATIVE EXAMPLE 1

A substrate glass with a photocatalyst carried thereon was prepared in the same manner as Examples 1–5, except that the glass composition was as shown in the table of FIG. 26.

As a result, the weight decrease after one hour was a measurement limitation or less. The photocatalyst on the substrate glass of Comparative Example 1 hardly decomposed the salad oil.

The invention has been mentioned above with reference to the preferred embodiments, but is not restricted to the aforementioned embodiments.

For example, the glass composition, the configuration of the glass material and the type of the photocatalyst are not restricted to those of the embodiments.

The photocatalyst carrying glass material of the invention can be widely used or applied in the fields other than filters, as a glass material which does not lower a photocatalyst activity.

As aforementioned, the photocatalyst carrying glass material of the invention uses the glass composition having no diffusion of impurities in the photocatalyst, having photocatalyst activity not deteriorated, having a photocatalyst thin film easily formed thereon, being superior in chemical durability, transparency and the like, and able to be manufactured inexpensively, and is, therefore, superior as the photocatalyst carrying glass material.

Also, by adjusting the composition, a photocatalyst carrying glass material easy to obtain a fine fiber, being superior in heat resistance and having other properties can be easily obtained inexpensively.

A light irradiating method is now described as a seventh operation mode of the invention. This light irradiating method can be applied in the aforementioned photocatalyst filter, or when light needs to efficiently irradiate the object to be irradiated. Various irradiating devices for light irradiation can have constitutions as shown in FIGS. 1(a)–(h).

Further, when forming a light irradiating fiber, a known technique of manufacturing an optical fiber can be used. For a sheet form of light guiding body, a known method of manufacturing a glass plate can be used. Also, to form the light guiding body in a honeycomb, raw material of glass or the like is granulated and compacted in a form of honeycomb, or a hollow light guiding body is worked and shaped in a honeycomb.

As a high refractive substance, glass, ceramic, plastic, crystal or the like can be used.

The ends of the light guiding bodies 1, 3 and 6 or the light irradiating fibers 4, 5 and 7 form incident portions for letting in light. The light from a not-shown luminous source, for example, a visible ultraviolet ray is irradiated to the incident portions.

The aforementioned light irradiating fiber and the luminous source form a light irradiating device. The light guided by the light guiding body from the luminous source and leaking from a high refractive substance irradiates the object to be irradiated (reactant).

Specific examples of the light-irradiating device are described with reference to following embodiments.

EMBODIMENT 1

In Embodiment 1, the light irradiating method and device of the invention are applied to a diesel particulate filter (DPF).

In the exhaust gas from a diesel engine, solid granulated matters (particulates) consisting of black smoke, unburnt hydrocarbon, lubricating oil and the like are included. The particulates are generated by the incomplete combustion of hydrocarbon in fuel. The hydrocarbon become black smoke when existing in the exhaust gas. Therefore, the discharging of the hydrocarbon as it is to the atmosphere is undesirable for the environment. For this, to remove and minimize particulates in the exhaust gas, particulates are collected with an appropriate filter. In the embodiment, with the aforementioned light irradiating fiber, particulates are collected. By irradiating the light guided from the luminous source to the light guiding body and leaking from the high refractive substance to the collected particulates, the particulates are burnt.

The DPF of the embodiment is disposed midway in an exhaust pipe behind an exhaust port of a diesel engine. The DPF installed in the exhaust pipe is constituted of a combination of basic units. Fibers are, as shown in FIG. 3(a), cut in predetermined lengths and arranged like blinds to form photocatalyst fibers. The basic unit is constituted of a plurality of the photocatalyst fibers 11, a support 12 for supporting one end of the plurality of photocatalyst fibers 11, and a halogen lamp a a luminous source 13 for injecting the light necessary for burning the collected particulates to the supported end of the photocatalyst fibers 11.

Two of the basic units are, as shown in FIG. 3(b), rotated 90° or appropriately and disposed in such a manner that the light irradiating fibers 11 form blind lattices, which is a basic filter. To increase a surface area and a collecting ratio, one or two or more basic filters are used to constitute the DPF.

For the light guiding body constituting the photocatalyst fiber 11 used is an alumino-silicate glass (glass transition point 500 to 800° C.) resistant to a high temperature (100 to 700° C.) exhaust gas or a quartz glass (glass transition point of about 1100° C.). A fiber diameter of the light irradiating fiber 11 is around between 1 μm and 150 μm. For the high refractive substance, $TiO_2$ is used.

The aforementioned light irradiating fiber 11 is manufactured as follows. An alumino-silicate glass using a high-purity raw material is melted in a platinum crucible, the molten glass is shaped in a fiber in a pushing method, and the fiber glass is covered with a $TiO_2$ film in a sol-gel method. In this case, when an adherence strength reinforcing agent is added to increase the adherence strength, the protective function of the $TiO_2$ film can further be enhanced. The film thickness is adjusted to 0.5 μm. A light irradiating fiber structure is manufactured as shown in FIG. 4.

Here, the refractive index of the $TiO_2$ is between 2.1 and 2.6, and that of alumino-silicate glass is around 1.5. Therefore, the $TiO_2$ film corresponding to the clad has a higher refractive index. Therefore, the light injected from the halogen lamp 13 to the light irradiating fiber 11 leaks from the light guiding body 1 and also from the high refractive substance or photocatalyst 2. The leaking light efficiently burns the collected particulates.

EMBODIMENT 2

In embodiment 2, the light irradiating method and device of the invention is applied to an ultraviolet sterilizing device.

Figure 27:
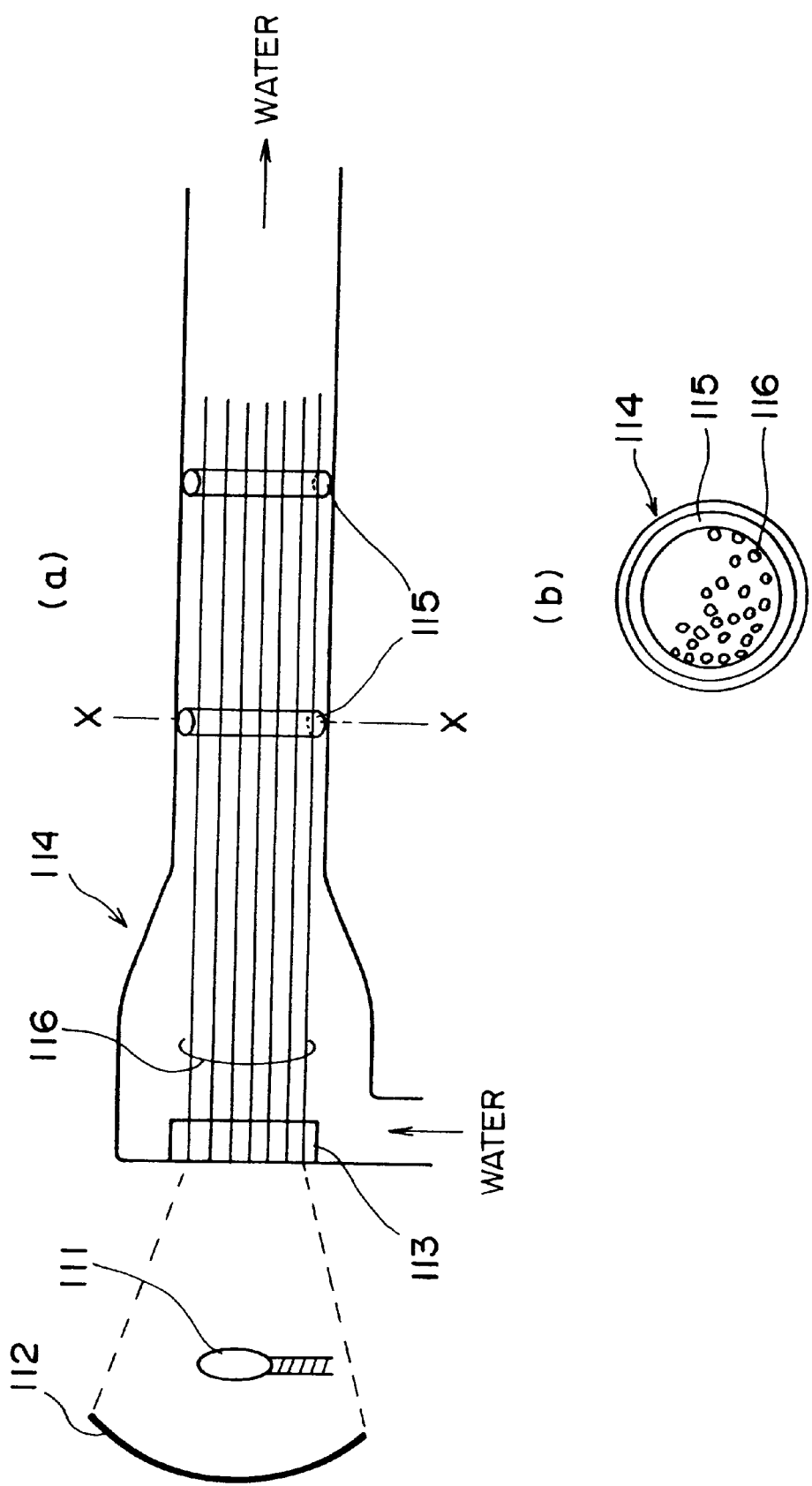
FIG. 27 is an explanatory view of an ultraviolet sterilizing device according to an embodiment of the invention: (a) is a plan view and (b) is a sectional view taken along line X—X of (a).

FIG. 27 is an explanatory view of the ultraviolet sterilizing device of Embodiment 2. In the ultraviolet sterilizing device, a plurality of light irradiating fibers 116 are bundled with O rings 115 fixed to a wall of a metal pipe 114. One end of the light irradiating fibers 116 is held by a fixing metal 113 attached to the metal pipe 114. Further outside the metal pipe 114, an ultraviolet lamp 111 and a reflective mirror 112 are installed. The light emitted from the ultraviolet lamp 111 and reflected by the reflective mirror 112 is injected from one end of the light irradiating fibers 116 held with the fixing metal 113 to the light irradiating fibers 116.

In such constitution, when water is passed in the metal pipe 114, water is sterilized by the ultraviolet ray leaking from the high refractive substance of the light irradiating fibers 116. By adjusting the intervals of the light irradiating fibers 116, the ultraviolet irradiating device functions also as a filter for capturing bacteria and the like. Therefore, bacteria can be temporarily captured before sterilization is securely performed.

Also, by adjusting the length of the light irradiating fibers 116, the sterilization capacity of the ultraviolet irradiating device can be adjusted.

In the ultraviolet irradiating device, since the intervals among a large number of light irradiating fibers 116 are narrow, ultraviolet ray can securely reach much contaminated lake water or the like. Its sterilization capacity may be very high.

The invention is not restricted to the aforementioned operation modes, and permits various modifications.

For example, the light irradiating method and device of the invention can be applied for an interior purpose.

INDUSTRIAL APPLICABILITY

With a simple structure in which light irradiates directly from the inside of a light guiding body carrying a photocatalyst, light can efficiently irradiate therefore.

Therefore, when the photocatalyst filter device of the invention is used for treating fluid, a long durable device free of maintenance can be realized.

Also the photocatalyst filter of the invention can be applied not only to a diesel particulate filter, but also to an air filter for a clean room, an air cleaner and the like.

What is claimed is:

1. A photocatalyst filter comprising:
    a bundle of a plurality of elongate light guiding filter body members; each of said body members comprising a fiber of light transmissive material which serves as a light guiding path and transmits light therethrough necessary for activating a photocatalyst, each of said fibers having a plurality of protrusions distributed along the length thereof, to form between the fibers in the bundle a plurality of passages which enable a fluid to be passed therethrough while filtering any contaminants therefrom, and a layer of said photocatalyst formed on a surface of each of said fibers and said protrusions, wherein rays of said light which are introduced incident upon a longitudinal end surface of said fibers leak out into said layer of photocatalyst, while said rays of light propagate through said fibers, so as to directly irradiate said layer of photocatalyst.

2. A photocatalyst filter according to claim 1, wherein said plurality of fibers comprise glass fibers.

3. A photocatalyst filter according to claim 1 wherein said light transmissive material comprises:
    $SiO_2$—30 to 80 weight %
    $Al_2O_3$—1 to 35 weight %
    $B_2O_3$—0 to 30 weight %
    a combined content of MgO, CaO, SrO, BaO and ZnO of 0 to 65 weight %
    a combined content of $Li_2O$, $Na_2O$, $K_2O$, of 0 to 10 weight %
    the combined content of said MgO, said CaO, said SrO, said BaO, said ZnO, said $Li_2O$, said $Na_2O$, said $K_2O$ and said $Cs_2O$ being 0.1 to 65 weight %.

4. A photocatalyst filter according to claim 1, wherein said light guiding filter body members have a transmittivity of at least about 75% of light in a wavelength sufficient for activating said photocatalyst layer in a thickness of 10 mm.

5. A photocatalyst filter according to claim 1, wherein said photocatalyst layer has a refractive index higher than that of said light guiding filter body members.

6. A photocatalyst filter according to claim 1, wherein said protrusions have a diameter of 0.3 to 100 μm and said fibers have gaps within the range of 0.3 to 100 μm therebetween.

7. A photocatalyst filter according to claim 1, wherein said bundle of filter body members further comprises a heating means for heating fluid to be filtered through the passages, and for heating said light guiding filter body members to a predetermined temperature.

8. A photocatalyst filter according to claim 1, wherein said plurality of fibers are bundled together to terminate at one end and to form an opening at the other end to receive particles to be filtered.

9. A photocatalyst filter according to claim 8, wherein said opening is adapted to receive exhaust gases containing particles from an engine.

10. A photocatalyst filter according to claim 1:

wherein said photocatalyst filter further incorporates a light source for introducing said light into said light guiding filter body members.

11. A photocatalyst filter according to claim 1 comprising a gas processing device.

12. A photocatalyst filter according to 1 comprising a device for processing gas and filtering particles therefrom.

13. A photocatalyst filter according to claim 1 wherein said light transmissive material comprises a glass fiber material selected form the group consisting of a low-alkali silicate glass, an alumino-silicate glass, a boro-silicate glass and a non-alkali glass; said material containing 30 to 80% by weight of $SiO_2$ and 0 to 10% by weight of an alkali component.

* * * * *